(12) United States Patent
Kawabe et al.

(10) Patent No.: US 11,318,567 B2
(45) Date of Patent: May 3, 2022

(54) FLUX-CORED WIRE

(71) Applicant: Kobe Steel, Ltd., Kobe (JP)

(72) Inventors: Naoki Kawabe, Kanagawa (JP); Eri Yamamoto, Osaka (JP); Kei Yamazaki, Kanagawa (JP); Reiichi Suzuki, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 154 days.

(21) Appl. No.: 16/094,386

(22) PCT Filed: Apr. 25, 2017

(86) PCT No.: PCT/JP2017/016427
§ 371 (c)(1),
(2) Date: Oct. 17, 2018

(87) PCT Pub. No.: WO2017/188275
PCT Pub. Date: Nov. 2, 2017

(65) Prior Publication Data
US 2019/0126411 A1 May 2, 2019

(30) Foreign Application Priority Data
Apr. 28, 2016 (JP) .............................. JP2016-090988

(51) Int. Cl.
*B23K 35/368* (2006.01)
*C22C 38/46* (2006.01)
(Continued)

(52) U.S. Cl.
CPC ............ *B23K 35/368* (2013.01); *B23K 35/30* (2013.01); *B23K 35/3073* (2013.01);
(Continued)

(58) Field of Classification Search
CPC .. B23K 35/30; B23K 35/3073; B23K 35/368; C22C 38/00; C22C 38/001;
(Continued)

(56) References Cited

U.S. PATENT DOCUMENTS 3,258,842 A * 7/1966 Nishi ................. B23K 35/3053
219/137 R
3,866,015 A * 2/1975 Matsumoto ........ B23K 35/0266
219/146.52
(Continued)

FOREIGN PATENT DOCUMENTS

JP 62033093 * 2/1987
JP 03-161192 * 7/1991
(Continued)

OTHER PUBLICATIONS

Extended European Search Report dated Sep. 23, 2019, in Patent Application No. 17789557.0, citing documnets AO-AP therein, 9 pages.
(Continued)

*Primary Examiner* — Joel M Attey
*Assistant Examiner* — Frederick F Calvetti
(74) *Attorney, Agent, or Firm* — Oblon, McClelland, Maier & Neustadt, L.L.P.

(57) ABSTRACT

In this flux-cored wire, the contents of F, Li, acid-soluble Al, Mg, S, $CO_2$, Ba, Ca, Sr, REM, P, C which is not derived from a carbonate, Mn, Ni, and Cu are set to fall within prescribed ranges with respect to the total mass of the wire, and the blending ratio among these components is set to fall within a particular range.

10 Claims, 1 Drawing Sheet

(51) Int. Cl.
  *B23K 35/30* (2006.01)
  *C22C 38/00* (2006.01)
  *C22C 38/02* (2006.01)
  *C22C 38/04* (2006.01)
  *C22C 38/06* (2006.01)
  *C22C 38/42* (2006.01)
  *C22C 38/44* (2006.01)
  *C22C 38/48* (2006.01)
  *C22C 38/50* (2006.01)
  *C22C 38/54* (2006.01)

(52) U.S. Cl.
  CPC .......... *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/00* (2013.01)

(58) Field of Classification Search
  CPC ..... C22C 38/002; C22C 38/008; C22C 38/02; C22C 38/04; C22C 38/06; C22C 38/42; C22C 38/44; C22C 38/46; C22C 38/48; C22C 38/50; C22C 38/54
  See application file for complete search history.

(56) References Cited

U.S. PATENT DOCUMENTS

| | | | | |
|---|---|---|---|---|
| 5,718,776 A * | 2/1998 | Yoshie | ................... | C22C 38/04 148/320 |
| 6,264,760 B1 * | 7/2001 | Tamehiro | ................ | C22C 38/12 148/336 |
| 7,812,284 B2 * | 10/2010 | Narayanan | ........... | B23K 35/368 219/146.23 |
| 7,959,709 B2 * | 6/2011 | Numata | ................... | C22C 38/02 75/570 |
| 8,262,767 B2 * | 9/2012 | Numata | ................ | C21C 7/0075 75/512 |
| 8,624,163 B2 * | 1/2014 | Karogal | ............... | B23K 35/368 219/146.1 |
| 8,759,715 B2 * | 6/2014 | Narayanan | ........... | B23K 9/1043 219/130.51 |
| 9,018,563 B2 * | 4/2015 | Yamazaki | ............ | B23K 35/383 219/130.1 |
| 9,102,013 B2 * | 8/2015 | Kasai | ................... | B23K 35/368 |
| 9,259,806 B2 * | 2/2016 | Nakamura | ............ | C22C 38/002 |
| 9,505,088 B2 * | 11/2016 | Nakamura | ......... | B23K 35/0261 |
| 9,533,368 B2 * | 1/2017 | Miyata | ................ | B23K 9/173 |
| 9,616,528 B2 * | 4/2017 | Izutani | ............... | B23K 35/0261 |
| 9,770,789 B2 * | 9/2017 | Saruwatari | ......... | B23K 35/3608 |
| 10,682,718 B2 * | 6/2020 | Miyata | ................... | B23K 9/173 |
| 10,702,955 B2 * | 7/2020 | Miyata | ................... | C22C 38/04 |
| 10,946,486 B2 * | 3/2021 | Watanabe | ............. | B23K 35/30 |
| 2009/0261085 A1 * | 10/2009 | Suzuki | ................ | B23K 35/362 219/137 PS |
| 2010/0263772 A1 * | 10/2010 | Lee | ........................ | C21D 8/065 148/598 |
| 2011/0062133 A1 * | 3/2011 | Inoue | ................... | B23K 35/361 219/145.22 |
| 2011/0073570 A1 * | 3/2011 | Shimura | ............ | B23K 35/3073 219/74 |
| 2011/0114606 A1 * | 5/2011 | Suzuki | ............... | B23K 35/3053 219/74 |
| 2012/0241433 A1 * | 9/2012 | Kojima | ............. | B23K 35/3605 219/145.22 |
| 2013/0161303 A1 * | 6/2013 | Kasai | ...................... | C22C 38/04 219/137 WM |
| 2014/0305921 A1 * | 10/2014 | Kawasaki | .......... | B23K 35/3033 219/146.22 |
| 2015/0007904 A1 * | 1/2015 | Tanizawa | ............. | B23K 9/0253 138/171 |
| 2015/0117937 A1 * | 4/2015 | Nakamura | ............. | C22C 38/12 403/272 |
| 2015/0360327 A1 * | 12/2015 | Nakamura | ......... | B23K 35/3066 403/272 |
| 2016/0121433 A1 * | 5/2016 | Miyata | .................... | C22C 38/48 219/145.22 |
| 2016/0129532 A1 * | 5/2016 | Saruwatari | ............ | C22C 38/005 219/74 |
| 2016/0193699 A1 * | 7/2016 | Han | .................. | B23K 35/0266 219/145.22 |
| 2016/0318133 A1 * | 11/2016 | Han | .................... | B23K 35/3033 |
| 2017/0274482 A1 * | 9/2017 | Han | ........................ | B23K 35/30 |
| 2018/0133844 A1 * | 5/2018 | Schaeffer | ................ | C22C 38/02 |
| 2019/0030655 A1 * | 1/2019 | Watanabe | ................ | C22C 38/04 |
| 2019/0126411 A1 * | 5/2019 | Kawabe | ................ | C22C 38/008 |
| 2019/0329347 A1 * | 10/2019 | Fujimoto | ........... | B23K 35/3602 |
| 2020/0306896 A1 * | 10/2020 | Ikai | .................... | B23K 35/3086 |

FOREIGN PATENT DOCUMENTS

| | | | |
|---|---|---|---|
| JP | 3-161192 A | | 7/1991 |
| JP | 2000-301382 A | | 10/2000 |
| JP | 2000301382 | * | 10/2000 |
| JP | 3566131 | * | 9/2002 |
| JP | 3566131 B2 | | 9/2004 |
| JP | 2009-119497 A | | 6/2009 |
| JP | 2012081514 | * | 4/2012 |
| KR | 2002-0005328 A | | 1/2002 |
| KR | 20020005328 | * | 1/2002 |

OTHER PUBLICATIONS

International Search Report dated Aug. 8, 2017 in PCT/JP2017/016427 (with English translation), citing documents AO, AP and AQ therein, 5 pages.

Written Opinion of the International Searching Authority dated Aug. 8, 2017 in PCT/JP2017/016427 (with English translation), AO and AP therein, 9 pages.

"Ship and Marine Engineering Structure Welding", China Communications Press, Edited by Chen Bingquan, Jul. 2001, p. 80, line 10-11 (with Partial English translation).

Flux-cored Wire, eds. Zhiling Tian, Chuan Pan, Dongtu Liang, Metallurgical Industry Press, Jun. 1999 vol. 1, Jun. 30, 1999, p. 30 to p. 31 (with partial English translation).

* cited by examiner

FLUX-CORED WIRE

TECHNICAL FIELD

The present invention relates to a flux-cored wire, and particularly to a flux-cored wire for self-shielded arc welding.

BACKGROUND ART

There is a shielded metal arc welding method as a joining method for joining a steel material by welding.

The shielded metal arc welding method is a relatively simple joining method which can be performed by applying a voltage between a welding material and a base metal by a welding power supply. By changing an alloy component of the welding material, the shielded metal arc welding can be widely applied to welding of various base metals. The shielded metal arc welding method is a useful joining method in developing countries where infrastructure is not sufficiently developed since supply of gas or the like is not needed.

In the shielded metal arc welding method, a welding device is simple, and thus, the welding device is easy to carry, and the shielded metal arc welding method is excellent in wind resistance. Thus, the shielded metal arc welding method is also used in developed countries as a jointing method suitable for outdoor jointing.

However, the welding material used in the shielded metal arc welding method is a rod-shaped material of substantially tens of centimeters. It is necessary to interrupt the welding operation each time the material is used up so as to add a fresh welding material to the welding device. Therefore, welding by the shielded metal arc welding method is inevitably intermittent and inefficient in working sufficiency, and thus is not suitable for automation.

In contrast, a welding material in a gas-shielded arc welding method is a single wire of several kilograms to tens of kilograms, so that continuous operation is possible. Working efficiency of the gas-shielded arc welding method is higher as compared with the shielded metal arc welding method, and thus, the gas-shielded arc welding method is suitable for automation. Thus, the working efficiency can be improved by switching from the shielded metal arc welding method to the gas-shielded arc welding method and automating the welding operation.

However, the welding material used in the gas-shielded arc welding method is different from the welding material used in the shielded metal arc welding method, and does not contain components other than slag-forming components as components that protect a molten metal from the atmosphere. Thus, in a case of performing welding operation by the gas-shielded arc welding method, it is necessary to perform the welding while supplying a carbon dioxide gas, an argon gas, or a mixed gas thereof as a shielding gas around a weld metal. However, when the welding operation is performed outdoors with insufficient windbreak countermeasures, pore defects or deterioration in mechanical properties tend to occur since the shielding gas is easily disturbed by the wind.

As described above, the shielded metal arc welding method and the gas-shielded arc welding method have both advantages and disadvantages, respectively. Accordingly, it is difficult to perform the welding operation suitably by these welding methods, for example, in an outdoor environment where supply of gas is difficult when it is desired to improve the working efficiency.

A self-shielded arc welding method can solve these problems.

The self-shielded arc welding method uses a wire capable of being continuously supplied as a welding material like the welding material used in the gas-shielded arc welding method, and thus, the self-shielded arc welding method can be continuously performed. The welding material used in the self-shielded arc welding method contains components that protect the weld metal from the atmosphere, and supply of the shielding gas is not needed as in the shielded metal arc welding method. In addition, protection of the molten metal from the atmosphere does not depend on the shielding gas, so that the self-shielded arc welding method is excellent in wind resistance.

Accordingly, the above problems can be solved since the self-shielded arc welding method has advantages of both the shielded metal arc welding method and the gas-shielded arc welding method.

As for the self-shielded arc welding method, for example, Patent Document 1 proposed a flux-cored wire for self-shielded arc welding for refractory steel, which has a steel outer sheath filled with a flux. In the flux-cored wire, the flux contains, in mass % relative to a total mass of the wire, $BaF_2$: 6.5% to 11.0%, a Sr composite oxide: 3.0% to 5.0%, and Mg: 1.0% to 3.0%, and one or both of the steel outer sheath and the flux contains, in total, C: 0.02 to 0.07%, Mn: 0.5% to 2.0%, Al: 1.0% to 2.5%, Ni: 1.6% to 3.0%, and Mo: 0.3% to 0.8%, and others being Fe of the steel outer sheath, one or two of a metal fluoride and a metal carbonate in an amount of 3% or less (including 0%), and iron powders in an amount of 10% or less (including 0%) and unavoidable impurities.

CITATION LIST

Patent Document

Patent Document 1: JP-A-2009-119497

SUMMARY OF THE INVENTION

Technical Problems

As described above, the self-shielded arc welding method has not been sufficiently widely spread although having many advantages. This is because it is difficult to design the welding material used in the self-shielded arc welding method to satisfy required properties (welding workability, mechanical properties of a weld metal, pore resistance, cracking resistance, and reduction of diffusible hydrogen content), since the welding material used in the self-shielded arc welding method is different from the welding material used in the shielded metal arc welding method or the gas-shielded arc welding method.

The reason why it is difficult to design a welding material satisfying the above properties is that each component constituting the flux-cored wire used in the self-shielded arc welding method exerts an influence on each other, so that the component design for the wire is highly complicated and in a fumble state.

Specifically, in the technique disclosed in Patent Document 1, a predetermined amount of Al is contained. The Al has an aspect of preventing pore defects of the weld metal, and an aspect of deteriorating the mechanical properties (strength, toughness, and the like) of the weld metal by coarsening a microstructure thereof. Therefore, in the technique disclosed in Patent Document 1, C, Mn, and Ni are used as essential components to ensure the mechanical properties in order to prevent coarsening of the microstructure due to the incorporation of Al.

However, the C, Mn, and Ni not only prevent coarsening of the microstructure, but also improve the strength of the weld metal, and thus, the strength is higher than necessary (see Table 3 of Patent Document 1: a tensile strength at room temperature is 700 N/mm² or more and a 0.2% yield strength at room temperature is 600 N/mm² or more).

Here, in a case where the tensile strength of the weld metal should be 430 MPa or more (particularly about 430 MPa to 670 MPa), it is necessary to reduce the contents of the C, Mn, and Ni or increase the content of the Al according to the technique disclosed in Patent Document 1, but in these methods, not only the strength is lowered but also the toughness is lowered.

Accordingly, an object of the present invention is to provide a flux-cored wire in which the welding workability is excellent, diffusible hydrogen content in a weld metal is small, pore resistance and cracking resistance are excellent, and tensile strength and toughness of a weld metal are also excellent.

Solution to Problems

As a result of intensive studies to solve the above problems, the present inventors have found that the problems can be solved by specifying content of each component constituting the flux-cored wire in detail, and the present invention has been completed.

That is, the flux-cored wire according to the present invention is a flux-cored wire for self-shielded arc welding, which has a steel outer sheath filled with a flux, the flux-cored wire comprising, relative to a total mass of the wire:

F: 0.10 mass % or more and 4.00 mass % or less;
Li: 0.25 mass % or more and 2.30 mass % or less;
acid-soluble Al: 1.00 mass % or more and 5.25 mass % or less;
Mg: 0.80 mass % or more and 3.10 mass % or less;
S: 0.0005 mass % or more and 0.2000 mass % or less;
$CO_2$: 0 mass % or more and 2.00 mass % or less;
Ba: 0 mass % or more and 8.00 mass % or less;
Ca: 0 mass % or more and 5.00 mass % or less;
Sr: 0 mass % or more and 2.00 mass % or less;
REM: 0 mass % or more and 1.50 mass % or less;
P: 0.070 mass % or less; and
one or more of C not derived from a carbonate: 0.65 mass % or less, Mn: 11.00 mass % or less, Ni: 11.00 mass % or less, and Cu: 1.50 mass % or less, wherein the following Formulas (1) to (4) are satisfied:

$$0.60 \leq 10 \times [\text{C not derived from carbonate}] + [\text{Mn}] + [\text{Ni}] + [\text{Cu}] \leq 15.00 \quad (1)$$

$$7.5 \times [\text{Li}] - [\text{acid-soluble Al}] + 10 \times [\text{C not derived from carbonate}] + [\text{Mn}] + [\text{Ni}] + [\text{Cu}] \geq 1.50 \quad (2)$$

$$0.33 \times [\text{F}] + [\text{acid-soluble Al}] + [\text{Li}] + [\text{Mg}] + [CO_2] \geq 3.00 \quad (3)$$

$$[\text{Mn}] + [\text{Ba}] + [\text{Ca}] + [\text{Sr}] + [\text{REM}] - 20 \times [\text{S}] \geq -0.60 \quad (4)$$

wherein the term [component] in the above formulas is a content (mass %) of its component relative to the total mass of the wire.

According to the flux-cored wire, since contents of the components of F, Li, acid-soluble Al, Mg, S, $CO_2$, Ba, Ca, Sr, REM, P, C not derived from the carbonate, Mn, Ni and Cu fall within the predetermined ranges and satisfy the Formulas (1) to (4), the welding workability is excellent, the diffusible hydrogen content in the weld metal is small, the pore resistance and cracking resistance are excellent, and the tensile strength and toughness of the weld metal are also excellent.

The flux-cored wire according to the present invention may further contain one or more of Cr, Mo, V, and W, and a total content of these components may be 4.00 mass % or less relative to the total mass of the wire.

According to the flux-cored wire, since the total content of one or more of the Cr, Mo, V, and W is not more than the predetermined value, the tensile strength of the weld metal can be further improved.

The flux-cored wire according to the present invention may further contain one or more of Nb, Ta, and Co, and a total content of these components may be 1.00 mass % or less relative to the total mass of the wire.

According to the flux-cored wire, since the total content of one or more of Nb, Ta, and Co is not more than the predetermined value, the tensile strength of the weld metal can be further improved.

It is preferred that the flux-cored wire according to the present invention contains one or more of the Ba, the Ca, the Sr, and the REM, and a total content of these components is 0.15 mass % or more, relative to the total mass of the wire.

According to the flux-cored wire, since the total content of one or more of the Ba, the Ca, the Sr, and the REM is not less than the predetermined value, the welding workability can be more excellent.

It is preferred that the flux-cored wire according to the present invention preferably contains the Ba in a content of 0.50 mass % or more relative to the total mass of the wire and the F in a content of 0.50 mass % or more relative to the total mass of the wire, and a total content of the Ba, the Ca, the Sr, and the REM is 1.40 mass % or more relative to the total mass of the wire.

According to the flux-cored wire, it is possible to reduce (or almost eliminate) droplets formed at a tip of the wire during welding with positive polarity, and it is possible to reduce a spatter.

The flux-cored wire according to the present invention may further contain one or more of Ti and Zr, and a total content of these components may be 0.01 mass % or more and 3.00 mass % or less relative to the total mass of the wire.

According to the flux-cored wire, since the total content of one or more of the Ti and Zr falls within the predetermined range, the welding workability can be more excellent.

The flux-cored wire according to the present invention may contain an iron oxide in an amount of 3.00 mass % or more, in terms of FeO, relative to the total mass of the wire.

According to the flux-cored wire, since the iron oxide in terms of FeO is contained not less than a predetermined value, the toughness can be more excellent.

In the flux-cored wire according to the present invention, a content of Mg contained as a metal powder or alloy powder in the Mg content is preferably 0.80 mass % or more relative to the total mass of the wire.

According to the flux-cored wire, since the Mg is contained as the metal powder or the alloy powder in an amount not less than the predetermined value, the Mg also has an effect as a deoxidizing agent.

The flux-cored wire according to the present invention may further contains Bi, and a content of the Bi may be 0.100 mass % or less relative to the total mass of the wire.

According to the flux-cored wire, since the Bi is contained in an amount not more than the predetermined value, the slag removability can be improved.

The flux-cored wire according to the present invention may further contains B, and a content of the B may be 0.100 mass % or less relative to the total mass of the wire.

According to the flux-cored wire, since the B is contained in an amount not more than the predetermined value, deterioration in toughness can be reliably prevented.

The flux-cored wire according to the present invention may further contain one or more of Na, K, and Cs, and a total content of the Li, the Na, the K, and the Cs may be 2.50 mass % or less relative to the total mass of the wire.

According to the flux-cored wire, since one or more of Na, K, and Cs is contained, and the total content of Li, Na, K, and Cs is not more than the predetermined value, the welding workability can be more excellent.

The flux-cored wire according to the present invention may further contains Si, and a content of the Si may be 0.01 mass % or more and 3.00 mass % or less relative to the total mass of the wire.

Since the flux-cored wire contains the Si in the predetermined range, the molten pool can be appropriately protected from the atmosphere.

The flux-cored wire according to the present invention may further contains Zn, and a content of the Zn may be 1.00 mass % or less relative to the total mass of the wire.

The flux-cored wire according to the present invention preferably satisfies the relationship of "[F]+0.5×[acid-soluble Al]+[Li]+[Mg]+[CO$_2$]≤7.00" represented by Formula (5).

Since the flux-cored wire satisfies the Formula (5), the fume emission can be prevented.

Advantageous Effects of Invention

Since the flux-cored wire according to the present invention specifies the contents of predetermined components in detail, the welding workability is excellent, the diffusible hydrogen content in the weld metal is small, the pore resistance and cracking resistance are excellent, and the tensile strength and toughness of the weld metal are also excellent.

DESCRIPTION OF EMBODIMENTS

Figure 1A:
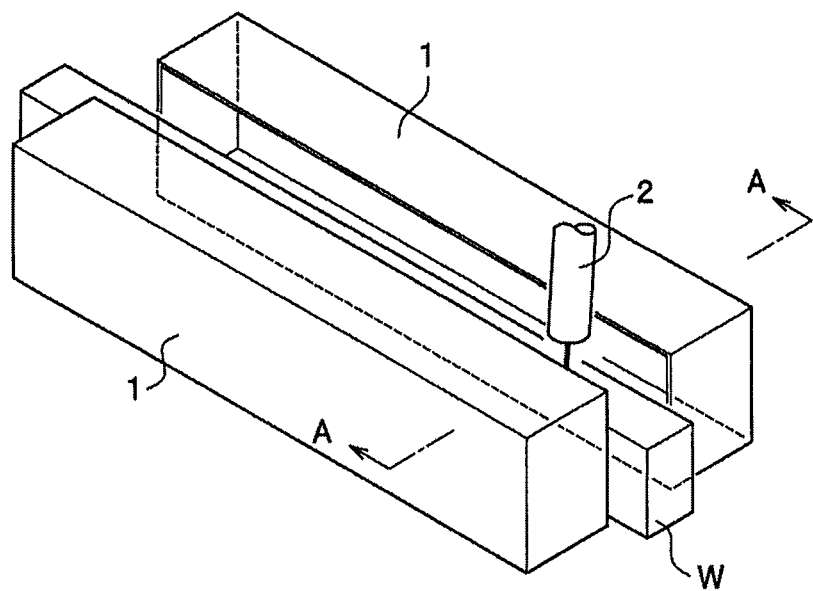
FIG. 1A is an explanatory view of a spatter collection method for measuring a spatter generation in the present invention, and is a perspective view of a collection box, a torch, and a material to be welded.

Embodiments of a flux-cored wire according to the present invention are described in detail below.

«Flux-Cored Wire»

A flux-cored wire (hereinafter, appropriately referred to as "wire") according to the present embodiment is used for self-shielded arc welding without using a shielding gas. The flux-cored wire is a wire having a steel outer sheath filled with a flux.

Specifically, the wire according to the present embodiment includes a steel outer sheath having a tubular shape and a flux filling the steel outer sheath. The wire may be in any form of a seamless type without seam on the steel outer sheath, and a seam type with a seam on the steel outer sheath. In addition, the surface (an outer side of the steel outer sheath) of the wire may or may not be subjected to plating.

A wire diameter of the wire according to the present embodiment is not particularly limited and may be 1.2 mm to 3.2 mm. A flux filling rate of the wire is not particularly limited and may be 10 mass % to 25 mass %.

The wire according to the present embodiment specifies content of each component relative to a total mass of the wire (=mass of the steel outer sheath+mass of the flux).

Reasons for specifying the content of each component of the wire according to the present embodiment are described below.

<F: 0.10 Mass % or More and 4.00 Mass % or Less>

F has an effect of reducing diffusible hydrogen content in a weld metal. When the F content is less than 0.10 mass %, the diffusible hydrogen content in the weld metal cannot be sufficiently reduced. Meanwhile, when the F content exceeds 4.00 mass %, fumes are frequently emitted during welding, and it is difficult to visually recognize the welded portion, so that welding workability is lowered.

Therefore, the F content is 0.10 mass % or more and 4.00 mass % or less relative to the total mass of the wire, and the upper limit thereof is preferably 3.5 mass %.

Examples of an F source include a fluoride and a composite fluoride, such as LiF, BaF$_2$, BaLiF$_3$ and K$_2$SiF$_6$, and a resin containing fluorine, which are added to the flux.

<Li: 0.25 Mass % or More and 2.30 Mass % or Less>

Li acts as a positive charge in arc plasma as Li$^+$ and has an effect of further improving the welding workability by stabilizing the arc plasma. In addition, the Li has effects of protecting a molten metal from nitrogen, improving pore resistance of the weld metal, and improving toughness of the weld metal.

Further, the Li also has an effect of improving the toughness of the weld metal by reducing the amount of Al in the molten metal. When the Li content is less than 0.25 mass %, the above effects are difficult to be obtained, and particularly, the pore resistance and toughness of the weld metal cannot be achieved at the same time. Meanwhile, when the Li content exceeds 2.30 mass %, the spatters are generated in a large amount during welding and the welding workability is lowered.

Therefore, the Li content is 0.25 mass % or more and 2.30 mass % or less relative to the total mass of the wire, and the lower limit thereof is preferably 0.35 mass %.

Examples of a Li source include a fluoride such as LiF, a composite fluoride such as BaLiF$_3$, a composite oxide such as lithium ferrite and lithium titanate, and an Al—Li alloy, which are added to the flux.

<Acid-Soluble Al: 1.00 Mass % or More and 5.25 Mass % or Less>

Acid-soluble Al (Sol. Al) has deoxidizing action and denitrifying action, and has an effect of reducing an amount of oxygen and nitrogen in the weld metal to improve the pore resistance, and improving tensile strength and toughness of the weld metal. In addition, the acid-soluble Al has an effect of preventing pore formation due to presence of nitrogen by combining with the nitrogen in the molten metal to form a nitride. When the content of the acid-soluble Al is less than 1.00 mass %, the above effects are difficult to be obtained, and particularly, an ability to immobilize the nitrogen in the molten metal is insufficient and the pore formation cannot be sufficiently prevented. Meanwhile, Al is an element that forms a ferrite structure, and a coarse ferrite structure is formed in the weld metal when the content of the acid-soluble Al exceeds 5.25 mass %, so that the toughness of the weld metal is lowered.

Therefore, the content of the acid-soluble Al is 1.00 mass % or more and 5.25 mass % or less relative to the total mass of the wire.

The acid-soluble Al refers to aluminum to be decomposed by operation defined in 8.1 of JIS G 1257-10-2:2013, and the content of the acid-soluble Al can be measured by the method specified in JIS G 1257-10-2:2013.

In addition to those to be added to the steel outer sheath, examples of an acid-soluble Al source include an Al metal powder and an alloy powder such as Fe—Al, Al—Mg Al—Li—Cu, and Mg—Al—Zn, which are added to the flux.

<Mg: 0.80 Mass % or More and 3.10 Mass % or Less>

Mg has effects of preventing the pore formation in the weld metal and improving the toughness of the weld metal by protecting the weld metal from the atmosphere through vaporizing during welding or through forming slag on a surface of a molten pool. When the Mg content is less than 0.80 mass %, the above effects are difficult to be obtained. Meanwhile, when the Mg content exceeds 3.10 mass %, the spatters are generated in a large amount during welding and the welding workability is lowered.

Therefore, the Mg content is 0.80 mass % or more and 3.10 mass % or less relative to the total mass of the wire.

Examples of an Mg source include an alloy powder such as Al—Mg, Ni—Mg, Fe—Si—Mg and Mg—Al—Zn, MgO, and $MgCO_3$, which are added to the flux.

<S: 0.0005 Mass % or More and 0.2000 Mass % or Less>

S has effects of reducing a grain size of the spatters and improving the welding workability by lowering viscosity and surface tension of droplets when the wire melts and smoothing the transfer of the droplets. When the S content is less than 0.0005 mass %, the above effects are difficult to be obtained. Meanwhile, when the S content exceeds 0.2000 mass %, it is difficult to prevent the occurrence of cracking even if a component for preventing deterioration in cracking resistance is separately contained since S is an element which lowers the cracking resistance, as described below.

Therefore, the S content is 0.0005 mass % or more and 0.2000 mass % or less relative to the total mass of the wire, and the lower limit thereof is preferably 0.0015 mass %.

In addition to those to be added to the steel outer sheath, examples of an S source include a sulfide such as iron sulfide and copper sulfide, and a sulfate, which are added to the flux. Further, examples of the S source also include an S compound to be applied to the surface of the wire.

<$CO_2$: 0 Mass % or More and 2.00 Mass % or Less>

$CO_2$ refers to $CO_2$ derived from a carbonate ($CO_2$ contained in the carbonate) and has effects of protecting the droplets or the molten pool from the atmosphere and improving the pore resistance or mechanical properties (tensile strength and toughness) of the weld metal, by vaporizing during the welding. However, in the present invention, $CO_2$ is not an essential component and may be 0 mass % since the above effects can be ensured by other components. Meanwhile, when the $CO_2$ content exceeds 2.00 mass %, the spatters are generated in a large amount during welding and the welding workability is lowered.

Therefore, the $CO_2$ content is 0 mass % or more and 2.00 mass % or less relative to the total mass of the wire.

Examples of a $CO_2$ source include various carbonates such as limestone, lithium carbonate and barium carbonate.

<Ba: 0 Mass % or More and 8.00 Mass % or Less, Ca: 0 Mass % or More and 5.00 Mass % or Less, Sr: 0 Mass % or More and 2.00 Mass % or Less, and REM: 0 Mass % or More and 1.50 Mass % or Less>

Ba, Ca, Sr and REM have effects of emitting electrons and stabilizing arc plasma. These components also have an effect of preventing hot cracking due to S. However, in the present invention, these components are not essential components and may be 0 mass % since the above effects can be ensured by other components. Meanwhile, when the Ba content exceeds 8.00 mass %, the Ca content exceeds 5.00 mass %, the Sr content exceeds 2.00 mass %, or the REM content exceeds 1.50 mass %, the spatters are generated in a large amount during welding and the welding workability is lowered.

Therefore, relative to the total mass of the wire, the Ba content is 0 mass % or more and 8.00 mass % or less, the Ca content is 0 mass % or more and 5.00 mass % or less, the Sr content is 0 mass % or more and 2.00 mass % or less, and the REM content is 0 mass % or more and 1.50 mass % or less.

The REM refers to a rare earth element such as Ce and La, and may be one kind or two or more kinds thereof. In the case of containing two or more kinds thereof, it is necessary that the total content of the rare earth element falls within the range of the REM content.

Examples of Ba, Ca, Sr and REM sources include a carbonate, a composite oxide and a fluoride, which are added to the flux.

<P: 0.070 Mass % or Less>

P deteriorates the cracking resistance and the mechanical properties of the weld metal. When the P content exceeds 0.070 mass %, deterioration in cracking resistance and deterioration in mechanical performance of the weld metal clearly appear.

Therefore, the P content is 0.070 mass % or less relative to the total mass of the wire.

It is difficult to adjust the P content to be 0 mass %, and thus, 0 mass % is not included as the range of the P content. However, it is preferable to limit the P content as small as possible.

<One or More of C Not Derived from a Carbonate: 0.65 Mass % or Less, Mn: 11.00 Mass % or Less, Ni: 11.00 Mass % or Less, and Cu: 1.50 Mass % or Less>

C not derived from a carbonate (hereinafter, simply referred to as "C" as appropriate), Mn, Ni and Cu are austenite-forming elements, and have effects of preventing formation of the coarse ferrite structure due to the presence of Al and improving the mechanical properties of the weld metal, particularly tensile strength and toughness. However, when the C content exceeds 0.65 mass %, the Mn content exceeds 11.00 mass %, the Ni content exceeds 11.00 mass %, or the Cu content exceeds 1.50 mass %, the strength of the weld metal becomes too high and the toughness or the cracking resistance may be lowered.

Therefore, the wire according to the present embodiment contains one or more of C: 0.65 mass % or less, Mn: 11.00 mass % or less, Ni: 11.00 mass % or less, and Cu: 1.50 mass % or less, relative to the total mass of the wire.

Here, the "C not derived from a carbonate" is defined based on the intention to exclude C derived from a carbonate since C in the form of a carbonate hardly has the above effects. In other words, the "C not derived from a carbonate" is meant to be C contained in the wire in the form other than a carbonate. Further, in other words, the "C not derived from a carbonate" is meant to be C from which C derived from a carbonate is excluded.

In addition to those to be added to the steel outer sheath, examples of a C source include an iron powder and an alloy powder each having a large carbon content, a carbon simple substance such as graphite, graphite, and carbon nanotube, and an organic matter such as starch and cornstarch, which are added to the flux. In addition to those to be added to the steel outer sheath, examples of Mn, Ni, and Cu sources include a single metal or alloy powder thereof, which are added to the flux. Further, examples of the Cu source also include Cu plating to be applied to the surface of the wire.

<Formula (1)>

In order to obtain the desired tensile strength of the weld metal, it is necessary that the contents of the C, Mn, Ni, and Cu satisfies "$0.60 \leq 10 \times [$C not derived from carbonate$]+[$Mn$]+[$Ni$]+[$Cu$] \leq 15.00$" represented by Formula (1) (wherein the term "[component]" in the formula is a content (mass %) of its component relative to the total mass of the wire).

As described above, each component in Formula (1) has the effect of preventing the formation of the coarse ferrite structure due to the presence of Al and improving the mechanical properties (tensile strength and toughness) of the weld metal. When the value calculated by Formula (1) is less than 0.60, the effect of improving the mechanical properties (tensile strength and toughness) of the weld metal described above cannot be sufficiently exhibited. Meanwhile, when the value calculated by Formula (1) exceeds 15.00, the strength of the weld metal becomes too high, and the toughness or the cracking resistance are lowered.

Therefore, the value calculated by Formula (1) is 0.60 or more and 15.00 or less.

The coefficients provided for each [component] in Formula (1) are specified based on the results of the experiment, taking into account the degree of the influence of each component on the effect.

<Formula (2)>

In order to ensure excellent toughness, it is necessary that the contents of the Li, acid-soluble Al, C, Mn, Ni, and Cu satisfies "$7.5 \times [$Li$]-[$acid-soluble Al$]+10 \times [$C not derived from carbonate$]+[$Mn$]+[$Ni$]+[$Cu$] \geq 1.50$" represented by Formula (2) (wherein the term "[component]" in the formula is a content (mass %) of its component relative to the total mass of the wire).

The acid-soluble Al in Formula (2) is an essential component for ensuring the pore resistance. However, when the content is too large, the coarse ferrite structure is formed in the weld metal and the toughness of the weld metal is lowered. Meanwhile, the Li in Formula (2) reduces the Al amount in the weld metal, and the C, Mn, Ni and Cu prevent the formation of the coarse ferrite structure. When the value calculated by Formula (2) is less than 1.50, the effect of preventing the formation of the coarse ferrite structure cannot be sufficiently obtained and the toughness of the weld metal is lowered.

Therefore, the value calculated by Formula (2) is 1.50 or more, and the preferable lower limit is 3.00.

The coefficients provided for each [component] in Formula (2) are specified based on the results of the experiment, taking into account the degree of the influence of each component on the effect.

<Formula (3)>

In order to ensure excellent pore resistance, it is necessary that the contents of the F, acid-soluble Al, Li, Mg, and $CO_2$ satisfies "$0.33 \times [$F$]+[$acid-soluble Al$]+[$Li$]+[$Mg$]+[CO_2] \geq 3.00$" represented by Formula (3) (wherein the term "[component]" in the formula is a content (mass %) of its component relative to the total mass of the wire).

Each component in Formula (3) has the effects of protecting the weld metal from the atmosphere and improving the pore resistance. When the value calculated by Formula (3) is less than 3.00, the effect of improving the pore resistance cannot be sufficiently exhibited.

Therefore, the value calculated by Formula (3) is 3.00 or more.

The coefficients provided for each [component] in Formula (3) are specified based on the results of the experiment, and the coefficient 0.33 provided for [F] is decided by taking into account the fact that F has a relatively low contribution to the pore resistance and the contribution degree thereof.

<Formula (4)>

In order to ensure excellent cracking resistance, it is necessary that the contents of the S, Mn, Ba, Ca, Sr, and REM satisfies "$[$Mn$]+[$Ba$]+[$Ca$]+[$Sr$]+[$REM$]-20 \times [$S$] \geq -0.60$" represented by Formula (4) (wherein the term "[component]" in the formula is a content (mass %) of its component relative to the total mass of the wire).

The S in Formula (4) is an essential component for ensuring the welding workability, but when the S content is too large, the cracking resistance is lowered. Meanwhile, the Mn, Ba, Ca, Sr, and REM prevent deterioration in cracking resistance due to S. When the value calculated by Formula (4) is −0.60 or more, the excellent cracking resistance can be ensured.

Therefore, the value calculated by Formula (4) is −0.60 or more.

The coefficients provided for each [component] in Formula (4) are specified based on the results of the experiment, taking into account the degree of the influence of each component on the effect.

<Remainder: Fe and Unavoidable Impurities>

The wire according to the present embodiment contains 71 mass % to 91 mass % of Fe and may contain Sn, Pb, N or the like as unavoidable impurities to the extent that the effects of the present invention are not affected. The Sn content is 0.05 mass % or less, the Pb content is 0.05 mass % or less, and the N content is 0.1 mass % or less, relative to the total mass of the wire.

As for Sn, Pb, N or the like, not only when these are contained as unavoidable impurities but also even when these are added positively, as long as the predetermined content is not exceeded, the effects of the present invention are not hindered.

O may be contained as a component for constituting a carbonate or various oxides or as a trace component in the steel outer sheath or metal powder.

Further, the Ca, Sr, REM or the like having a lower limit of 0 mass %, the P only having an upper limit specified, the C, Mn, Ni and Cu which are not essential components, and the Cr, Mo, V, W, Nb, Ta, Co, Ti, Zr, Bi, B, Na, K, Cs, Si, and Zn described below may also be contained as unavoidable impurities in an amount of not more than a predetermined amount (for example, 0.1 mass % or less relative to the total mass of the wire).

The content of each element listed as the unavoidable impurities may of course be 0 mass %.

As described below, the wire according to the present embodiment may further contain other components in addition to the above components, and it is preferable that the wire satisfies further requirements.

In addition to those to be added to the steel outer sheath, examples of each component source include a single metal or an alloy powder, which are added to the flux.

<One or More of Cr, Mo, V, and W>

None of Cr, Mo, V, and W is an essential component. However, since these components have the effect of improving the strength of the weld metal, one or more of these components may be contained in the wire in a case where high strength is required. However, when the total content of these components exceeds 4.00 mass %, the strength of the weld metal becomes too high, and the toughness or the cracking resistance are lowered.

Therefore, in the case where the wire according to the present embodiment contains one or more of the Cr, Mo, V, and W, the total content of these components is preferably 4.00 mass % or less relative to the total mass of the wire.

<One or More of Nb, Ta, and Co>

None of Nb, Ta, and Co is an essential component. However, since these components have the effect of improving the strength of the weld metal, one or more of these components may be contained in the wire in a case where high strength is required. However, when the total content of these components exceeds 1.00 mass %, the strength of the weld metal becomes too high, and the toughness or the cracking resistance are lowered.

Therefore, in the case where the wire according to the present embodiment contains one or more of the Nb, Ta, and Co, the total content of these components is preferably 1.00 mass % or less relative to the total mass of the wire.

<One or More of Ba, Ca, Sr, and REM>

As described above, the content of any one of Ba, Ca, Sr, and REM may be 0 mass %. In a case where it is desired to stabilize the arc plasma by these components, particularly to improve the welding workability with positive polarity (DC welding connecting the positive electrode side to a base metal and the negative electrode side to a welding rod holder), it is preferable that one or more of these components is contained in a total amount of 0.15 mass % or more relative to the total mass of the wire.

Further, in a case of reducing (or almost eliminating) the droplets formed at the tip of the wire during welding with positive polarity and reducing the spattering, it is preferable that one or more of the Ba, Ca, Sr and REM is contained in a total amount of 1.40 mass % or more relative to the total mass of the wire, and the B content is controlled to 0.50 mass % or more and the F content is controlled to 0.50 mass % or more.

<One or More of Ti and Zr>

None of Ti and Zr is an essential component, but these components have the effect of concentrating the arc and improving the welding workability. When the total content of these components is less than 0.01 mass %, the above effects are difficult to be obtained. Meanwhile, when the total content of these components exceeds 3.00 mass %, the arc may be concentrated too much, and the welding workability may be lowered.

Therefore, in the case where the wire according to the present embodiment contains one or more of the Ti and the Zr, the total content of these components is preferably 0.01 mass % or more and 3.00 mass % or less relative to the total mass of the wire.

<Iron Oxide: 3.00 Mass % or More>

Iron oxide is not an essential component, but has effects of discharging excess Al in the weld metal as slag, and improving the toughness. By containing 3.00 mass % or more of the iron oxide in terms of FeO, even in a case where high toughness is required, the requirement can be satisfied.

Therefore, in the case where the wire according to the present embodiment contains the iron oxide, it is preferable that the content is 3.00 mass % or more in terms of FeO relative to the total mass of the wire.

The upper limit of the content of the iron oxide is not particularly limited and, for example, is 10 mass % in terms of FeO relative to the total mass of the wire.

Here, the iron oxide refers to an iron oxide such as $Fe_2O_3$ and $Fe_3O_4$, and a composite oxide containing iron such as lithium ferrite and ilmenite.

<Containing Form of Mg>

As described above, Mg has effects of preventing the pore formation in the weld metal and improving the toughness of the weld metal. However, in the case where Mg is contained in the wire as a metal powder or an alloy powder (metallic powder or alloyed powder), the Mg also has an effect as a deoxidizing agent. When the content of Mg contained as the metal powder or the alloy powder in the Mg content is less than 0.80 mass %, the above effects are difficult to be obtained.

Therefore, the content of Mg contained as the metal powder or the alloy powder in the Mg content is preferably 0.80 mass % or more, relative to the total mass of the wire.

<Bi: 0.100 Mass % or Less>

Bi is not an essential component, but has the effect of improving slag removability. However, when the Bi content exceeds 0.100 mass %, the toughness may be lowered.

Therefore, in the case where the wire according to the present embodiment contains Bi, the Bi content is preferably 0.100 mass % or less relative to the total mass of the wire.

<B: 0.100 Mass % or Less>

B is not an essential component, but has an effect of preventing the toughness from being lowered due to nitrogen in the weld metal. However, when the B content exceeds 0.100 mass %, the cracking resistance may be lowered.

Therefore, in the case where the wire according to the present embodiment contains B, the B content is preferably 0.100 mass % or less relative to the total mass of the wire.

<One or More of Na, K, and Cs: Total Content of Li, Na, K, and Cs>

None of Na, K, and Cs is an essential component, but these components have the effects of stabilizing the arc plasma and improving the welding workability, like the case of Li. However, when the total content of the Li, Na, K, and Cs components exceeds 2.50 mass %, the spatters are generated in a large amount during welding and the welding workability is lowered.

Therefore, in the case where the wire according to the present embodiment contains one or more of the Na, K, and Cs, the total content of the Li, Na, K, and Cs components is preferably 2.50 mass % or less relative to the total mass of the wire.

<Si: 0.01 Mass % or More and 3.00 Mass % or Less>

Si is not an essential component, but has effects of producing slag on the surface of the molten pool and protecting the molten pool from the atmosphere. When the Si content is less than 0.01 mass %, the above effects are difficult to be obtained. Meanwhile, when the Si content exceeds 3.00 mass %, the slag removability may be lowered.

Therefore, in the case where the wire according to the present embodiment contains Si, the Si content is preferably 0.01 mass % or more and 3.00 mass % or less relative to the total mass of the wire.

<Zn: 1.00 Mass % or Less>

Zn is not an essential component and may be contained together with Mg or Al when Mg or Al is contained in the wire as an alloy powder. However, when the Zn content exceeds 1.00 mass %, the fumes are frequently emitted during welding, it is difficult to visually recognize the welded portion, and the welding workability is lowered.

Therefore, in the case where the wire according to the present embodiment contains Zn, the Zn content is preferably 1.00 mass % or less relative to the total mass of the wire.

<Formula (5)>

In a case where it is required to affect the frequency of fume emission and to reduce the frequency of fume emission more reliably, it is preferable that the contents of the F, acid-soluble Al, Li, Mg, and $CO_2$ satisfies "[F]+0.5×[acid-soluble Al]+[Li]+[Mg]+[$CO_2$]≤7.00" represented by Formula (5) (wherein the term "[component]" in the formula is a content (mass %) of its component relative to the total mass of the wire).

Each component in Formula (5) causes the fume emission during welding. When the value calculated by Formula (5) is 7.00 or less, the frequency of fume emission during welding can be more reliably reduced.

Therefore, the value calculated by Formula (5) is preferably 7.00 or less.

The coefficients provided for each [component] in Formula (5) are specified based on the results of the experiment, and the coefficient 0.5 provided for [Al] is decided by taking into account the fact that Al is difficult to become the cause of the fume emission among these components, and the increase of fume emission is relatively small due to an increase in addition amount of Al.

<Others>

The components of the steel outer sheath of the wire according to the present embodiment are not particularly limited, and the variation in the S content in the entire wire can be prevented by containing S in an amount of 0.0008 mass % or more relative to the mass of the steel outer sheath.

The composition of the steel outer sheath of the flux-cored wire according to the present embodiment and other unclarified properties may be those already known and are not limited as long as the effects obtained by the above properties are exhibited.

Hereinafter, a method for manufacturing the wire according to the present embodiment is described.

«Method for Manufacturing Wire»

Examples of methods for manufacturing the wire according to the present embodiment include a method of spreading a flux in the length direction of band steel, enclosing the flux by the steel and molding and drawing the same to have a circular cross section, and a method of filling a steel pipe having a large diameter with a flux and drawing the same. Since the effects of the present invention are not affected by either method, the wire may be produced by either method.

The method for manufacturing the wire according to the present embodiment is described above. Concerning the condition not explicitly described, conventional conditions may be used, and it goes without saying that the conditions can be appropriately changed as long as the effects of the present invention are exhibited.

EXAMPLES

Hereinafter, the flux-cored wire according to the present invention is concretely described by comparing Examples satisfying the requirements of the present invention and Comparative examples not satisfying the requirements of the present invention.

«Preparation of Test Material»

A flux-cored wire (wire diameter: 1.6 mm) having wire components shown in Tables 1 and 2 was prepared by filling a steel outer sheath with a flux. The amount of each component contained in the flux-cored wire was measured in accordance with JIS G 1253:2002 and JIS Z 2613:1992.

The components of the wire shown in Tables 1 and 2 are shown in mass % relative to the total mass of the wire, the remainder being Fe and unavoidable impurities. "Metal powder" in Table 2 indicates a metal powder or an alloy powder.

In addition, the components of the steel sheet used in each test are shown in Tables 3 and 4. The steel material satisfies both components of Tables 3 and 4 and the remainder is Fe and unavoidable impurities.

In addition, welding conditions in each test are shown in Tables 5, 6, and 7.

TABLE 1

| Wire No. | F | Li | Acid-soluble Al | Mg | S | $CO_2$ | Ba | Ca | Sr | REM | P |
|---|---|---|---|---|---|---|---|---|---|---|---|
| 1 | 0.33 | 0.84 | 3.56 | 1.40 | 0.0043 | 0.27 | 0.43 | 0.00 | 0.49 | 0.00 | ≤0.01 |
| 2 | 0.33 | 0.84 | 3.56 | 1.40 | 0.0043 | 0.27 | 0.43 | 0.00 | 0.49 | 0.00 | ≤0.01 |
| 3 | 0.20 | 0.83 | 5.03 | 1.13 | 0.0010 | 0.63 | 0.24 | 0.94 | 0.01 | 0.00 | ≤0.01 |
| 4 | 2.54 | 0.57 | 1.87 | 1.43 | 0.0042 | 0.00 | 5.80 | 0.29 | 0.08 | 0.00 | ≤0.01 |
| 5 | 2.54 | 0.57 | 1.87 | 3.06 | 0.0420 | 0.00 | 5.80 | 0.29 | 0.08 | 0.00 | ≤0.01 |
| 6 | 0.23 | 0.87 | 3.70 | 1.58 | 0.0030 | 0.17 | 0.44 | 0.19 | 0.50 | 0.00 | ≤0.01 |
| 7 | 0.23 | 0.25 | 3.80 | 1.58 | 0.0030 | 0.17 | 0.44 | 0.19 | 0.50 | 0.00 | ≤0.01 |
| 8 | 0.23 | 0.87 | 3.70 | 1.58 | 0.0030 | 0.17 | 0.44 | 0.19 | 0.50 | 0.00 | ≤0.01 |
| 9 | 0.12 | 0.84 | 3.56 | 1.40 | 0.0043 | 0.27 | 0.43 | 0.00 | 0.00 | 0.00 | ≤0.01 |
| 10 | 3.96 | 2.27 | 3.70 | 1.58 | 0.0030 | 0.17 | 0.44 | 0.19 | 0.50 | 0.00 | ≤0.01 |
| 11 | 0.33 | 0.84 | 3.56 | 1.40 | 0.0043 | 0.27 | 0.43 | 0.00 | 0.49 | 0.00 | ≤0.01 |
| 12 | 0.33 | 0.84 | 3.56 | 1.40 | 0.0043 | 0.27 | 0.43 | 0.00 | 0.49 | 0.00 | ≤0.01 |
| 13 | 0.33 | 0.84 | 3.56 | 1.40 | 0.0043 | 0.27 | 0.43 | 0.00 | 0.49 | 0.00 | ≤0.01 |
| 14 | 0.33 | 0.84 | 3.56 | 1.40 | 0.0043 | 0.27 | 0.43 | 0.00 | 0.49 | 0.00 | ≤0.01 |
| 15 | 2.78 | 0.65 | 2.36 | 1.59 | 0.0350 | 0.07 | 5.93 | 0.29 | 0.05 | 0.00 | ≤0.01 |
| 16 | 3.21 | 0.62 | 1.69 | 1.32 | 0.0120 | 0.00 | 6.97 | 0.10 | 0.07 | 0.00 | ≤0.01 |
| 17 | 3.52 | 0.62 | 1.69 | 1.32 | 0.0120 | 0.00 | 7.67 | 0.10 | 0.07 | 0.00 | ≤0.01 |
| 18 | 1.41 | 1.23 | 1.09 | 1.40 | 0.0043 | 0.27 | 0.43 | 0.00 | 0.49 | 0.00 | ≤0.01 |
| 19 | 1.41 | 1.23 | 3.54 | 0.85 | 0.0043 | 0.27 | 0.43 | 0.00 | 0.49 | 0.00 | ≤0.01 |
| 20 | 0.94 | 0.84 | 3.56 | 1.40 | 0.1900 | 0.27 | 3.56 | 0.00 | 0.49 | 1.39 | ≤0.01 |
| 21 | 0.33 | 0.84 | 3.56 | 1.40 | 0.0043 | 1.95 | 0.43 | 2.12 | 0.49 | 0.00 | ≤0.01 |
| 22 | 0.21 | 0.84 | 3.56 | 1.40 | 0.0043 | 0.27 | 0.00 | 0.00 | 0.49 | 0.00 | ≤0.01 |
| 23 | 3.66 | 0.62 | 2.04 | 1.08 | 0.0030 | 0.85 | 0.00 | 4.87 | 0.01 | 0.00 | ≤0.01 |
| 24 | 2.83 | 0.35 | 2.31 | 2.13 | 0.0009 | 0.00 | 2.20 | 2.58 | 0.06 | 0.00 | ≤0.01 |
| 25 | 2.83 | 0.35 | 2.31 | 2.13 | 0.0009 | 0.00 | 2.20 | 2.58 | 0.06 | 0.00 | ≤0.01 |
| 26 | 0.78 | 0.84 | 3.56 | 1.40 | 0.0043 | 0.27 | 0.43 | 0.00 | 1.90 | 0.00 | ≤0.01 |
| 27 | 0.33 | 0.84 | 3.56 | 1.40 | 0.0043 | 0.27 | 0.43 | 0.00 | 0.49 | 0.00 | ≤0.01 |
| 28 | 2.83 | 0.35 | 2.31 | 2.13 | 0.0009 | 0.00 | 2.20 | 2.58 | 0.06 | 0.00 | ≤0.01 |

TABLE 1-continued

| | | | | | | | | | | | |
|---|---|---|---|---|---|---|---|---|---|---|---|
| 29 | 0.33 | 0.84 | 3.56 | 1.40 | 0.0043 | 0.27 | 0.43 | 0.00 | 0.49 | 0.00 | ≤0.01 |
| 30 | 0.33 | 0.84 | 3.56 | 1.40 | 0.0043 | 0.27 | 0.43 | 0.00 | 0.49 | 0.00 | ≤0.01 |
| 31 | 0.33 | 0.84 | 3.56 | 1.40 | 0.0043 | 0.27 | 0.43 | 0.00 | 0.49 | 0.23 | ≤0.01 |
| 32 | 0.33 | 0.84 | 3.56 | 1.40 | 0.0043 | 0.27 | 0.43 | 0.00 | 0.49 | 0.00 | ≤0.01 |
| 33 | 0.33 | 0.84 | 3.56 | 1.40 | 0.0043 | 0.27 | 0.43 | 0.00 | 0.49 | 0.00 | ≤0.01 |
| 34 | 0.21 | 0.84 | 3.56 | 1.40 | 0.0043 | 0.27 | 0.00 | 0.00 | 0.00 | 0.00 | ≤0.01 |
| 35 | 0.33 | 0.84 | 3.56 | 1.40 | 0.0043 | 0.27 | 0.43 | 0.00 | 0.49 | 0.00 | ≤0.01 |
| 36 | 0.33 | 0.84 | 3.56 | 1.40 | 0.0043 | 0.27 | 0.43 | 0.00 | 0.49 | 0.00 | 0.021 |
| 37 | 0.33 | 0.84 | 3.56 | 1.40 | 0.0043 | 0.27 | 0.43 | 0.00 | 0.49 | 0.00 | 0.052 |
| 38 | 0.38 | 0.67 | 3.65 | 1.62 | 0.1030 | 0.63 | 1.22 | 0.10 | 0.00 | 0.00 | ≤0.01 |
| 39 | 2.83 | 0.35 | 2.31 | 2.13 | 0.0009 | 0.00 | 2.20 | 2.58 | 0.06 | 0.00 | ≤0.01 |
| 40 | 0.34 | 0.67 | 3.67 | 1.62 | 0.0009 | 0.63 | 1.22 | 0.00 | 0.00 | 0.00 | ≤0.01 |
| 41 | 2.75 | 0.57 | 1.08 | 0.87 | 0.0120 | 0.00 | 6.97 | 0.10 | 0.07 | 0.00 | ≤0.01 |
| 42 | 0.33 | 0.84 | 3.32 | 1.21 | 0.0043 | 0.27 | 0.43 | 0.00 | 0.49 | 0.00 | ≤0.01 |
| 43 | 0.33 | 0.84 | 3.56 | 1.40 | 0.0043 | 0.27 | 0.43 | 0.00 | 0.49 | 0.00 | ≤0.01 |
| 44 | 3.21 | 0.62 | 1.69 | 1.29 | 0.0120 | 0.00 | 6.97 | 0.10 | 0.07 | 0.00 | ≤0.01 |
| 45 | 0.33 | 0.84 | 3.56 | 1.40 | 0.0043 | 0.27 | 0.00 | 0.00 | 0.49 | 0.00 | ≤0.01 |
| 46 | 0.33 | 0.84 | 3.56 | 1.40 | 0.0043 | 0.27 | 0.00 | 0.00 | 0.49 | 0.00 | ≤0.01 |
| 47 | 3.21 | 0.83 | 1.87 | 1.43 | 0.0042 | 0.00 | 0.13 | 0.00 | 0.00 | 0.00 | ≤0.01 |
| 48 | 1.77 | 0.73 | 2.62 | 1.36 | 0.0081 | 0.13 | 3.70 | 0.05 | 0.28 | 0.00 | ≤0.01 |
| 49 | 0.95 | 0.00 | 2.87 | 1.12 | 0.0004 | 0.00 | 2.42 | 0.76 | 0.03 | 0.00 | ≤0.01 |
| 50 | 0.76 | 0.00 | 2.43 | 0.56 | 0.0030 | 0.52 | 1.31 | 0.82 | 0.01 | 0.00 | ≤0.01 |
| 51 | 0.94 | 0.06 | 2.21 | 0.58 | 0.0020 | 0.44 | 1.83 | 0.48 | 0.02 | 0.00 | ≤0.01 |
| 52 | 0.36 | 0.00 | 4.13 | 0.72 | 0.0050 | 0.06 | 0.72 | 0.18 | 0.01 | 0.00 | ≤0.01 |
| 53 | 6.96 | 2.41 | 4.13 | 0.92 | 0.0050 | 0.06 | 0.72 | 0.18 | 0.01 | 0.00 | ≤0.01 |
| 54 | 4.05 | 2.27 | 3.70 | 1.58 | 0.0030 | 0.17 | 0.44 | 0.19 | 0.50 | 0.00 | ≤0.01 |
| 55 | 0.23 | 0.22 | 3.70 | 1.58 | 0.0030 | 0.17 | 0.44 | 0.19 | 0.50 | 0.00 | ≤0.01 |
| 56 | 3.66 | 0.02 | 2.04 | 1.08 | 0.0030 | 0.85 | 0.01 | 4.04 | 0.01 | 0.00 | ≤0.01 |
| 57 | 0.95 | 0.10 | 2.45 | 0.74 | 0.0120 | 0.29 | 2.39 | 0.41 | 0.03 | 0.00 | ≤0.01 |
| 58 | 2.83 | 0.35 | 2.31 | 2.13 | 0.0009 | 0.00 | 2.20 | 2.58 | 0.06 | 0.00 | ≤0.01 |
| 59 | 0.00 | 0.67 | 3.67 | 1.62 | 0.0050 | 0.63 | 0.00 | 0.00 | 0.00 | 0.00 | ≤0.01 |
| 60 | 0.34 | 0.67 | 5.32 | 1.62 | 0.0050 | 0.63 | 1.22 | 0.00 | 0.00 | 0.00 | ≤0.01 |
| 61 | 0.34 | 0.67 | 0.92 | 1.62 | 0.0050 | 0.63 | 1.22 | 0.00 | 0.00 | 0.00 | ≤0.01 |
| 62 | 0.34 | 0.67 | 3.67 | 3.20 | 0.0050 | 0.63 | 1.22 | 0.00 | 0.00 | 0.00 | ≤0.01 |
| 63 | 0.33 | 0.84 | 3.56 | 1.40 | 0.2100 | 0.27 | 0.43 | 0.00 | 0.49 | 0.00 | ≤0.01 |
| 64 | 0.33 | 0.84 | 3.56 | 1.40 | 0.0043 | 2.05 | 0.43 | 2.12 | 0.49 | 1.61 | ≤0.01 |
| 65 | 2.31 | 0.84 | 3.56 | 1.40 | 0.0043 | 0.27 | 8.20 | 0.00 | 0.49 | 0.00 | ≤0.01 |
| 66 | 0.82 | 0.84 | 3.56 | 1.40 | 0.0043 | 0.27 | 0.43 | 0.00 | 0.00 | 2.16 | ≤0.01 |
| 67 | 5.42 | 0.84 | 3.56 | 1.40 | 0.0043 | 0.27 | 0.43 | 5.12 | 0.49 | 0.00 | ≤0.01 |
| 68 | 0.33 | 0.84 | 3.56 | 1.40 | 0.0043 | 0.27 | 0.43 | 0.00 | 0.49 | 0.00 | 0.071 |
| 69 | 0.34 | 0.52 | 1.21 | 0.83 | 0.0050 | 0.31 | 1.22 | 0.00 | 0.00 | 0.00 | ≤0.01 |
| 70 | 0.51 | 0.26 | 1.69 | 0.91 | 0.0050 | 0.06 | 0.72 | 0.18 | 0.01 | 0.00 | ≤0.01 |
| 71 | 2.83 | 0.35 | 2.31 | 2.13 | 0.0009 | 0.00 | 2.20 | 2.58 | 0.06 | 0.00 | ≤0.01 |
| 72 | 0.34 | 0.67 | 3.67 | 1.62 | 0.1030 | 0.63 | 1.22 | 0.00 | 0.00 | 0.00 | ≤0.01 |
| 73 | 3.21 | 0.62 | 1.69 | 1.32 | 0.0120 | 0.00 | 6.97 | 0.10 | 0.07 | 0.00 | ≤0.01 |
| 74 | 2.38 | 0.16 | 2.64 | 1.32 | 0.0060 | 0.06 | 0.13 | 2.84 | 0.01 | 0.00 | ≤0.01 |

| Wire No. | C (other than carbonate) | Mn | Ni | Cu | Formula (1) | Formula (2) | Formula (3) | Formula (4) |
|---|---|---|---|---|---|---|---|---|
| 1 | 0.06 | 0.88 | 0.00 | 0.00 | 1.49 | 4.22 | 6.17 | 1.72 |
| 2 | 0.06 | 0.88 | 0.00 | 0.00 | 1.50 | 4.23 | 6.17 | 1.72 |
| 3 | 0.07 | 1.58 | 0.01 | 0.01 | 2.29 | 3.49 | 7.69 | 2.75 |
| 4 | 0.07 | 1.45 | 0.01 | 0.01 | 2.15 | 4.56 | 4.71 | 7.54 |
| 5 | 0.07 | 1.45 | 0.01 | 0.01 | 2.18 | 4.59 | 6.34 | 6.78 |
| 6 | 0.28 | 0.68 | 0.02 | 0.01 | 3.51 | 6.34 | 6.40 | 1.75 |
| 7 | 0.28 | 0.68 | 0.02 | 0.01 | 3.51 | 1.59 | 5.88 | 1.75 |
| 8 | 0.28 | 0.68 | 0.02 | 0.01 | 3.51 | 6.34 | 6.40 | 1.75 |
| 9 | 0.06 | 0.88 | 0.00 | 0.00 | 1.48 | 4.21 | 6.10 | 1.23 |
| 10 | 0.28 | 0.68 | 0.02 | 0.01 | 3.51 | 16.84 | 9.03 | 1.75 |
| 11 | 0.06 | 0.88 | 0.00 | 0.00 | 1.48 | 4.21 | 6.17 | 1.72 |
| 12 | 0.06 | 0.88 | 0.00 | 0.00 | 1.48 | 4.21 | 6.17 | 1.72 |
| 13 | 0.06 | 0.88 | 0.00 | 0.00 | 1.48 | 4.21 | 6.17 | 1.72 |
| 14 | 0.06 | 0.88 | 0.00 | 0.00 | 1.48 | 4.21 | 6.17 | 1.72 |
| 15 | 0.05 | 0.79 | 0.74 | 0.01 | 2.02 | 4.54 | 5.59 | 6.36 |
| 16 | 0.01 | 2.09 | 1.00 | 0.03 | 3.23 | 6.19 | 4.69 | 8.99 |
| 17 | 0.01 | 2.09 | 1.00 | 0.03 | 3.23 | 6.19 | 4.79 | 9.69 |
| 18 | 0.06 | 0.88 | 0.00 | 0.00 | 1.48 | 9.61 | 4.45 | 1.72 |
| 19 | 0.06 | 0.88 | 0.00 | 0.00 | 1.48 | 7.16 | 6.35 | 1.72 |
| 20 | 0.06 | 0.88 | 0.00 | 0.00 | 1.48 | 4.21 | 6.37 | 2.52 |
| 21 | 0.06 | 0.88 | 0.00 | 0.00 | 1.48 | 4.21 | 7.86 | 3.84 |
| 22 | 0.06 | 0.88 | 0.00 | 0.00 | 1.48 | 4.21 | 6.13 | 1.29 |
| 23 | 0.26 | 0.32 | 0.02 | 0.01 | 2.95 | 5.56 | 5.80 | 5.14 |
| 24 | 0.05 | 1.23 | 1.56 | 0.02 | 3.29 | 3.61 | 5.72 | 6.05 |
| 25 | 0.04 | 1.23 | 10.30 | 0.02 | 11.96 | 12.28 | 5.72 | 6.05 |
| 26 | 0.06 | 0.88 | 0.00 | 0.00 | 1.48 | 4.21 | 6.32 | 3.13 |
| 27 | 0.61 | 0.88 | 0.00 | 0.00 | 6.98 | 9.71 | 6.17 | 1.72 |
| 28 | 0.04 | 10.50 | 0.00 | 0.00 | 10.92 | 11.24 | 5.72 | 15.32 |
| 29 | 0.06 | 0.88 | 1.05 | 1.46 | 3.99 | 6.72 | 6.17 | 1.72 |

TABLE 1-continued

| | | | | | | | | |
|---|---|---|---|---|---|---|---|---|
| 30 | 0.06 | 0.88 | 0.00 | 0.00 | 1.48 | 4.21 | 6.17 | 1.72 |
| 31 | 0.06 | 0.88 | 0.00 | 0.00 | 1.48 | 4.21 | 6.17 | 1.95 |
| 32 | 0.06 | 0.88 | 0.00 | 0.00 | 1.48 | 4.21 | 6.17 | 1.72 |
| 33 | 0.06 | 0.88 | 0.00 | 0.00 | 1.48 | 4.21 | 6.17 | 1.72 |
| 34 | 0.06 | 0.88 | 0.00 | 0.00 | 1.49 | 4.22 | 6.13 | 0.80 |
| 35 | 0.06 | 0.88 | 0.00 | 0.00 | 1.48 | 4.21 | 6.17 | 1.72 |
| 36 | 0.06 | 0.88 | 0.00 | 0.00 | 1.48 | 4.21 | 6.17 | 1.72 |
| 37 | 0.06 | 0.88 | 0.00 | 0.00 | 1.48 | 4.21 | 6.17 | 1.72 |
| 38 | 0.02 | 0.20 | 0.50 | 0.00 | 0.90 | 2.28 | 6.70 | −0.54 |
| 39 | 0.17 | 2.23 | 10.30 | 0.02 | 14.25 | 14.57 | 5.72 | 7.05 |
| 40 | 0.02 | 0.70 | 0.00 | 0.00 | 0.90 | 2.26 | 6.70 | 1.82 |
| 41 | 0.01 | 2.09 | 1.00 | 0.03 | 3.22 | 6.42 | 3.43 | 8.99 |
| 42 | 0.06 | 0.88 | 0.00 | 0.00 | 1.49 | 4.46 | 5.74 | 1.72 |
| 43 | 0.03 | 0.39 | 0.00 | 0.00 | 0.73 | 3.46 | 6.17 | 1.23 |
| 44 | 0.01 | 2.09 | 1.00 | 0.03 | 3.23 | 6.19 | 4.66 | 8.99 |
| 45 | 0.06 | 0.88 | 0.00 | 0.00 | 1.49 | 4.22 | 6.17 | 1.29 |
| 46 | 0.06 | 0.04 | 1.51 | 0.00 | 2.16 | 4.89 | 6.17 | 0.88 |
| 47 | 0.07 | 1.45 | 0.01 | 0.01 | 2.15 | 6.51 | 5.19 | 1.50 |
| 48 | 0.04 | 1.49 | 0.50 | 0.02 | 2.36 | 5.21 | 5.43 | 5.36 |
| 49 | 0.14 | 0.78 | 0.01 | 0.00 | 2.19 | −0.68 | 4.30 | 3.98 |
| 50 | 0.15 | 0.74 | 0.00 | 0.01 | 2.25 | −0.18 | 3.76 | 2.82 |
| 51 | 0.16 | 0.60 | 0.02 | 0.00 | 2.22 | 0.46 | 3.60 | 2.89 |
| 52 | 0.28 | 1.13 | 0.02 | 0.02 | 3.97 | −0.16 | 5.03 | 1.94 |
| 53 | 0.28 | 1.13 | 0.02 | 0.02 | 3.97 | 17.92 | 9.82 | 1.94 |
| 54 | 0.28 | 0.68 | 0.02 | 0.01 | 3.51 | 16.84 | 9.06 | 1.75 |
| 55 | 0.28 | 0.68 | 0.02 | 0.01 | 3.51 | 1.46 | 5.75 | 1.75 |
| 56 | 0.26 | 0.32 | 0.02 | 0.01 | 2.95 | 1.06 | 5.20 | 4.32 |
| 57 | 0.03 | 1.75 | 1.06 | 0.03 | 3.14 | 1.44 | 3.89 | 4.34 |
| 58 | 0.04 | 1.23 | 11.70 | 0.02 | 13.35 | 13.67 | 5.72 | 6.05 |
| 59 | 0.02 | 11.50 | 0.00 | 0.00 | 11.70 | 13.06 | 6.59 | 11.40 |
| 60 | 0.02 | 0.70 | 0.00 | 0.00 | 0.90 | 0.61 | 8.35 | 1.82 |
| 61 | 0.02 | 0.70 | 0.00 | 0.00 | 0.90 | 5.01 | 3.95 | 1.82 |
| 62 | 0.67 | 0.70 | 1.02 | 1.72 | 9.74 | 11.10 | 8.28 | 1.82 |
| 63 | 0.06 | 0.88 | 0.00 | 0.00 | 1.48 | 4.21 | 6.17 | −2.39 |
| 64 | 0.06 | 0.88 | 0.00 | 0.00 | 1.48 | 4.21 | 7.96 | 5.45 |
| 65 | 0.06 | 0.88 | 0.00 | 0.00 | 1.49 | 4.22 | 6.82 | 9.49 |
| 66 | 0.06 | 0.88 | 0.00 | 0.00 | 1.48 | 4.21 | 6.33 | 3.39 |
| 67 | 0.06 | 0.88 | 0.00 | 0.00 | 1.48 | 4.21 | 7.85 | 6.84 |
| 68 | 0.06 | 0.88 | 0.00 | 0.00 | 1.48 | 4.21 | 6.17 | 1.72 |
| 69 | 0.02 | 0.70 | 0.00 | 0.00 | 0.90 | 3.59 | 2.98 | 1.82 |
| 70 | 0.08 | 0.35 | 0.02 | 0.02 | 1.19 | 1.45 | 3.09 | 1.16 |
| 71 | 0.31 | 2.01 | 10.10 | 0.02 | 15.23 | 15.55 | 5.72 | 6.83 |
| 72 | 0.02 | 0.20 | 0.50 | 0.00 | 0.90 | 2.26 | 6.70 | −0.64 |
| 73 | 0.01 | 0.49 | 0.00 | 0.03 | 0.58 | 3.54 | 4.69 | 7.39 |
| 74 | 0.48 | 0.38 | 0.02 | 0.01 | 5.21 | 3.77 | 4.97 | 3.24 |

TABLE 2

| Wire No. | Cr | Mo | V | W | Cr + Mo + V + W | Nb | Ta | Co | Nb + Ta + Co | Ba + Ca + Sr + REM | Ti | Zr | Ti + Zr | FeO | Mg source | Bi | B | Na | K | Cs | Li + Na + K + Cs × | Si | Zn | Formula (5) |
|---|---|---|---|---|---|---|---|---|---|---|---|---|---|---|---|---|---|---|---|---|---|---|---|---|
| 1 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 2 | 0.00 | 0.00 | 0.00 | 0.00 | 0.00 | 0.00 | 0.00 | 0.00 | 0.00 | 0.92 | 0.00 | 0.00 | 0.00 | 8.25 | Metal powder | 0.000 | 0.000 | 0.00 | 0.15 | 0.00 |  | 0.31 | 0.00 | 4.62 |
| 3 | 0.00 | 0.00 | 0.00 | 0.00 | 0.00 | 0.00 | 0.00 | 0.00 | 0.00 | 1.19 | 0.12 | 0.00 | 0.12 | 7.32 | Metal powder | 0.000 | 0.000 | 0.00 | 0.00 | 0.00 |  | 0.45 | 0.00 | 5.31 |
| 4 | 0.00 | 0.00 | 0.00 | 0.00 | 0.00 | 0.00 | 0.00 | 0.00 | 0.00 | 6.17 | 0.00 | 0.12 | 0.12 | 0.00 | Metal powder | 0.000 | 0.000 | 0.00 | 0.00 | 0.00 |  | 0.28 | 0.00 | 5.48 |
| 5 | 0.00 | 0.00 | 0.00 | 0.00 | 0.00 | 0.00 | 0.00 | 0.00 | 0.00 | 6.17 | 0.12 | 0.00 | 0.12 | 0.00 | Metal powder | 0.000 | 0.000 | 0.00 | 0.00 | 0.00 |  | 0.46 | 0.00 | 7.11 |
| 6 | 0.00 | 0.00 | 0.00 | 0.00 | 0.00 | 0.00 | 0.00 | 0.00 | 0.00 | 1.13 | 0.00 | 0.06 | 0.06 | 7.13 | Metal powder | 0.000 | 0.000 | 0.00 | 0.00 | 0.00 |  | 0.46 | 0.00 | 4.70 |
| 7 | 0.00 | 0.00 | 0.00 | 0.00 | 0.00 | 0.00 | 0.00 | 0.00 | 0.00 | 1.13 | 0.00 | 0.00 | 0.00 | 0.00 | Metal powder | 0.000 | 0.000 | 0.00 | 0.00 | 0.00 |  | 0.00 | 0.00 | 4.13 |
| 8 | 0.00 | 0.00 | 0.00 | 0.00 | 0.00 | 0.00 | 0.00 | 0.00 | 0.00 | 1.13 | 0.00 | 0.00 | 0.00 | 7.13 | Metal powder | 0.000 | 0.000 | 0.00 | 0.00 | 0.00 |  | 0.31 | 0.00 | 4.70 |
| 9 | 0.00 | 0.00 | 0.00 | 0.00 | 0.00 | 0.00 | 0.00 | 0.00 | 0.00 | 0.43 | 0.21 | 0.20 | 0.41 | 8.25 | Metal powder | 0.000 | 0.000 | 0.00 | 0.15 | 0.00 |  | 0.47 | 0.00 | 4.40 |
| 10 | 0.00 | 0.00 | 0.00 | 0.00 | 0.00 | 0.00 | 0.00 | 0.00 | 0.00 | 1.13 | 0.21 | 0.20 | 0.41 | 8.25 | Metal powder | 0.000 | 0.000 | 0.00 | 0.00 | 0.00 | 2.42 | 2.89 | 0.91 | 9.83 |
| 11 | 0.00 | 0.00 | 0.00 | 0.00 | 0.00 | 0.05 | 0.00 | 0.00 | 0.05 | 0.92 | 0.21 | 0.20 | 0.41 | 8.25 | Metal powder | 0.005 | 0.001 | 0.00 | 0.15 | 0.00 |  | 0.31 | 0.00 | 4.62 |
| 12 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.52 | 0.15 | 0.00 | 1.51 | 0.31 | 0.00 | 4.62 |
| 13 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.00 | 0.25 | 1.09 | 0.00 | 0.00 | 4.62 |
| 14 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.00 | 0.25 | 1.09 | 0.00 | 0.00 | 4.62 |
| 15 | 0.00 | 0.00 | 0.00 | 0.00 | 0.00 | 0.00 | 0.00 | 0.00 | 0.00 | 6.27 | 0.12 | 0.15 | 0.27 | 0.00 | Metal powder | 0.000 | 0.000 | 0.00 | 0.00 | 0.00 |  | 0.28 | 0.00 | 6.27 |
| 16 | 0.00 | 0.00 | 0.00 | 0.00 | 0.00 | 0.00 | 0.00 | 0.00 | 0.00 | 7.14 | 0.00 | 0.00 | 0.00 | 0.00 | Metal powder | 0.000 | 0.000 | 0.00 | 0.00 | 0.00 |  | 0.15 | 0.00 | 6.00 |
| 17 | 0.00 | 0.00 | 0.00 | 0.00 | 0.00 | 0.00 | 0.00 | 0.00 | 0.00 | 7.84 | 0.00 | 0.00 | 0.00 | 0.00 | Metal powder | 0.000 | 0.000 | 0.00 | 0.00 | 0.00 |  | 0.15 | 0.00 | 6.31 |
| 18 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 1.38 | 0.31 | 0.00 | 4.85 |
| 19 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 1.38 | 0.31 | 0.00 | 5.53 |
| 20 | 0.00 | 0.00 | 0.00 | 0.00 | 0.00 | 0.00 | 0.00 | 0.00 | 0.00 | 5.44 | 0.21 | 0.20 | 0.41 | 8.25 | Metal powder | 0.000 | 0.000 | 0.00 | 0.15 | 0.00 | 0.99 | 0.31 | 0.00 | 5.22 |
| 21 | 0.00 | 0.00 | 0.00 | 0.00 | 0.00 | 0.00 | 0.00 | 0.00 | 0.00 | 3.04 | 0.21 | 0.20 | 0.41 | 8.25 | Metal powder | 0.000 | 0.000 | 0.00 | 0.15 | 0.00 | 0.99 | 0.31 | 0.00 | 6.30 |
| 22 | 0.00 | 0.00 | 0.00 | 0.00 | 0.00 | 0.00 | 0.00 | 0.00 | 0.00 | 0.49 | 0.21 | 0.20 | 0.41 | 8.25 | Metal powder | 0.000 | 0.000 | 0.00 | 0.15 | 0.00 | 0.99 | 0.31 | 0.00 | 4.49 |
| 23 | 0.00 | 0.00 | 0.00 | 0.00 | 0.00 | 0.00 | 0.00 | 0.00 | 0.00 | 4.88 | 0.00 | 0.00 | 0.00 | 0.00 | Metal powder | 0.000 | 0.000 | 0.00 | 0.00 | 0.00 |  | 0.32 | 0.00 | 7.23 |
| 24 | 0.00 | 0.00 | 0.00 | 0.00 | 0.00 | 0.00 | 0.00 | 0.00 | 0.00 | 4.84 | 0.21 | 0.20 | 0.41 | 8.25 | Metal powder | 0.000 | 0.000 | 0.00 | 0.15 | 0.00 |  | 0.24 | 0.00 | 6.47 |
| 25 | 0.00 | 0.00 | 0.00 | 0.00 | 0.00 | 0.00 | 0.00 | 0.00 | 0.00 | 4.84 | 0.21 | 0.20 | 0.41 | 8.25 | Metal powder | 0.000 | 0.000 | 0.00 | 0.15 | 0.00 |  | 0.24 | 0.00 | 6.47 |
| 26 | 0.00 | 0.00 | 0.00 | 0.00 | 0.00 | 0.00 | 0.00 | 0.00 | 0.00 | 2.33 | 0.21 | 0.20 | 0.41 | 8.25 | Metal powder | 0.000 | 0.000 | 0.00 | 0.15 | 0.00 | 0.99 | 0.31 | 0.00 | 5.06 |
| 27 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 28 | 0.00 | 0.00 | 0.00 | 0.00 | 0.00 | 0.00 | 0.00 | 0.00 | 0.00 | 4.84 | 0.00 | 0.00 | 0.00 | 0.00 | Metal powder | 0.000 | 0.000 | 0.00 | 0.15 | 0.00 | 0.99 | 0.24 | 0.00 | 6.47 |
| 29 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 30 | 0.00 | 0.00 | 0.00 | 0.00 | 0.00 | 0.00 | 0.00 | 0.59 | 0.91 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 31 | 0.00 | 0.00 | 0.00 | 0.00 | 0.00 | 0.27 | 0.05 | 0.00 | 0.00 | 1.15 | 0.21 | 0.20 | 0.41 | 8.25 | Metal powder | 0.000 | 0.005 | 0.00 | 0.15 | 0.00 | 0.99 | 0.31 | 0.00 | 4.62 |
| 32 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.091 | 0.00 | 0.15 | 0.00 | 0.99 | 0.31 | 0.00 | 4.62 |
| 33 | 0.00 | 0.00 | 0.00 | 0.00 | 0.00 | 0.00 | 0.00 | 0.00 | 0.00 | 0.00 | 0.21 | 0.20 | 0.41 | 8.25 | Metal powder | 0.091 | 0.000 | 0.00 | 0.15 | 0.00 | 0.99 | 0.31 | 0.00 | 4.62 |
| 34 | 0.00 | 3.31 | 0.00 | 0.00 | 3.82 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.50 |
| 35 | 0.51 | 0.00 | 0.00 | 0.00 | 0.00 | 0.00 | 0.00 | 0.00 | 0.00 | 0.92 | 0.21 | 2.65 | 2.86 | 8.25 | Metal powder | 0.000 | 0.000 | 0.00 | 0.15 | 0.00 | 0.99 | 0.31 | 0.00 | 4.62 |
| 36 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 37 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 38 | 0.00 | 0.00 | 0.00 | 0.00 | 0.00 | 0.00 | 0.00 | 0.00 | 0.00 | 1.32 | 0.00 | 0.00 | 0.00 | 6.58 | Metal powder | 0.000 | 0.000 | 0.00 | 0.00 | 0.00 |  | 0.31 | 0.00 | 5.13 |
| 39 | 0.00 | 0.00 | 0.00 | 0.00 | 0.00 | 0.00 | 0.00 | 0.00 | 0.00 | 4.84 | 0.00 | 0.00 | 0.00 | 6.58 | Metal powder | 0.000 | 0.000 | 0.00 | 0.00 | 0.00 |  | 0.30 | 0.00 | 6.47 |
| 40 | 0.00 | 0.00 | 0.00 | 0.00 | 0.00 | 0.00 | 0.00 | 0.00 | 0.00 | 1.22 | 0.00 | 0.15 | 0.15 | 0.00 | Metal powder | 0.000 | 0.000 | 0.00 | 0.00 | 0.00 |  | 0.24 | 0.00 | 5.10 |
| 41 | 0.00 | 0.00 | 0.00 | 0.00 | 0.00 | 0.00 | 0.00 | 0.00 | 0.00 | 7.14 | 0.12 | 0.15 | 0.27 | 8.25 | Metal powder | 0.000 | 0.000 | 0.00 | 0.15 | 0.00 |  | 0.30 | 0.00 | 4.73 |
| 42 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.15 | 0.00 | 4.31 |
| 43 | 0.00 | 0.00 | 0.00 | 0.00 | 0.00 | 0.00 | 0.00 | 0.00 | 0.00 | 0.92 | 0.21 | 0.20 | 0.41 | 8.25 | Non-metal powder | 0.000 | 0.000 | 0.00 | 0.15 | 0.00 | 0.99 | 0.31 | 0.00 | 4.62 |
| 44 | 0.00 | 0.00 | 0.00 | 0.00 | 0.00 | 0.00 | 0.00 | 0.00 | 0.00 | 7.14 | 0.12 | 0.15 | 0.27 | 0.00 | Non-metal powder | 0.000 | 0.000 | 0.00 | 0.00 | 0.00 |  | 0.15 | 0.00 | 5.97 |
| 45 | 0.00 | 0.00 | 0.00 | 0.00 | 0.00 | 0.00 | 0.00 | 0.00 | 0.00 | 0.49 | 0.21 | 0.20 | 0.41 | 8.25 | Metal powder | 0.000 | 0.000 | 0.00 | 0.15 | 0.00 | 0.99 | 0.31 | 0.00 | 4.62 |
| 46 | 0.00 | 0.00 | 0.00 | 0.00 | 0.00 | 0.00 | 0.00 | 0.00 | 0.00 | 0.92 | 0.00 | 0.00 | 0.00 | 8.25 | Metal powder | 0.000 | 0.000 | 0.00 | 0.15 | 0.00 | 0.99 | 0.00 | 0.00 | 4.62 |

TABLE 2-continued

| Wire No. | Cr | Mo | V | W | Cr + Mo + V + W | Nb | Ta | Co | Nb + Ta + Co | Ba + Ca + Sr + REM | Ti | Zr | Ti + Zr | FeO | Mg source | Bi | B | Na | K | Cs | Li + Na + K + Cs× | Si | Zn | Formula (5) |
|---|---|---|---|---|---|---|---|---|---|---|---|---|---|---|---|---|---|---|---|---|---|---|---|---|
| 47 | 0.00 | 0.00 | 0.00 | 0.00 | 0.00 | 0.00 | 0.00 | 0.00 | 0.00 | 0.13 | 0.00 | 0.12 | 0.12 | 3.67 | Metal powder | 0.000 | 0.000 | 0.00 | 0.00 | 0.00 | | 0.28 | 0.00 | 6.41 |
| 48 | 0.00 | 0.00 | 0.00 | 0.00 | 0.00 | 0.00 | 0.00 | 0.00 | 0.00 | 4.03 | 0.17 | 0.18 | 0.34 | 4.12 | Metal powder | 0.000 | 0.000 | 0.00 | 0.15 | 0.00 | 0.49 | 0.23 | 0.00 | 5.31 |
| 49 | 0.00 | 0.00 | 0.00 | 0.00 | 0.00 | 0.00 | 0.00 | 0.00 | 0.00 | 3.21 | 0.00 | 0.00 | 0.00 | 0.00 | Metal powder | 0.000 | 0.000 | 0.00 | 0.00 | 0.00 | | 0.44 | 0.00 | 3.51 |
| 50 | 0.00 | 0.00 | 0.00 | 0.00 | 0.00 | 0.00 | 0.00 | 0.00 | 0.00 | 2.14 | 0.00 | 0.00 | 0.00 | 0.00 | Metal powder | 0.000 | 0.000 | 0.00 | 0.00 | 0.00 | | 0.36 | 0.00 | 3.06 |
| 51 | 0.00 | 0.00 | 0.00 | 0.00 | 0.00 | 0.00 | 0.00 | 0.00 | 0.00 | 2.33 | 0.00 | 0.00 | 0.00 | 0.00 | Metal powder | 0.000 | 0.000 | 0.00 | 0.00 | 0.00 | | 0.23 | 0.00 | 3.13 |
| 52 | 0.00 | 0.00 | 0.00 | 0.00 | 0.00 | 0.00 | 0.00 | 0.00 | 0.00 | 0.91 | 0.00 | 0.00 | 0.00 | 0.00 | Metal powder | 0.000 | 0.000 | 0.00 | 0.00 | 0.00 | | 0.18 | 0.00 | 3.21 |
| 53 | 0.00 | 0.00 | 0.00 | 0.00 | 0.00 | 0.00 | 0.00 | 0.00 | 0.00 | 0.91 | 0.00 | 0.00 | 0.00 | 7.13 | Metal powder | 0.000 | 0.000 | 0.00 | 0.00 | 0.00 | | 0.18 | 0.00 | 12.42 |
| 54 | 0.00 | 0.00 | 0.00 | 0.00 | 0.00 | 0.00 | 0.00 | 0.00 | 0.00 | 1.13 | 0.00 | 0.00 | 0.00 | 0.00 | Metal powder | 0.000 | 0.000 | 0.00 | 0.00 | 0.00 | | 0.00 | 0.00 | 9.92 |
| 55 | 0.00 | 0.00 | 0.00 | 0.00 | 0.00 | 0.00 | 0.00 | 0.00 | 0.00 | 1.13 | 0.00 | 0.00 | 0.00 | 0.00 | Metal powder | 0.000 | 0.000 | 0.00 | 0.00 | 0.00 | | 0.46 | 0.00 | 4.05 |
| 56 | 0.00 | 0.00 | 0.00 | 0.00 | 0.00 | 0.00 | 0.00 | 0.00 | 0.00 | 4.06 | 0.00 | 0.00 | 0.00 | 0.00 | Metal powder | 0.000 | 0.000 | 0.00 | 0.00 | 0.00 | | 0.32 | 0.00 | 6.63 |
| 57 | 0.00 | 0.00 | 0.00 | 0.00 | 0.00 | 0.00 | 0.00 | 0.00 | 0.00 | 2.83 | 0.00 | 0.00 | 0.00 | 0.00 | Metal powder | 0.000 | 0.000 | 0.00 | 0.00 | 0.00 | | 0.15 | 0.00 | 3.31 |
| 58 | 0.00 | 0.00 | 0.00 | 0.00 | 0.00 | 0.00 | 0.00 | 0.00 | 0.00 | 4.84 | 0.00 | 0.00 | 0.00 | 0.00 | Metal powder | 0.000 | 0.000 | 0.00 | 0.00 | 0.00 | | 0.24 | 0.00 | 6.47 |
| 59 | 0.00 | 0.00 | 0.00 | 0.00 | 0.00 | 0.00 | 0.00 | 0.00 | 0.00 | 0.00 | 0.00 | 0.00 | 0.00 | 0.00 | Metal powder | 0.000 | 0.000 | 0.00 | 0.00 | 0.00 | | 0.30 | 0.00 | 4.76 |
| 60 | 0.00 | 0.00 | 0.00 | 0.00 | 0.00 | 0.00 | 0.00 | 0.00 | 0.00 | 1.22 | 0.00 | 0.00 | 0.00 | 6.58 | Metal powder | 0.000 | 0.000 | 0.00 | 0.00 | 0.00 | | 0.30 | 0.00 | 5.92 |
| 61 | 0.00 | 0.00 | 0.00 | 0.00 | 0.00 | 0.00 | 0.00 | 0.00 | 0.00 | 1.22 | 0.00 | 0.00 | 0.00 | 6.58 | Metal powder | 0.000 | 0.000 | 0.00 | 0.00 | 0.00 | | 0.30 | 0.00 | 3.72 |
| 62 | 0.00 | 0.00 | 0.00 | 0.00 | 0.00 | 0.00 | 0.00 | 0.00 | 0.00 | 1.22 | 0.21 | 0.20 | 0.41 | 6.58 | Metal powder | 0.000 | 0.000 | 0.00 | 0.00 | 0.00 | | 0.30 | 0.00 | 6.68 |
| 63 | 0.00 | 0.00 | 0.00 | 0.00 | 0.00 | 0.00 | 0.00 | 0.00 | 0.00 | 0.92 | 0.21 | 0.20 | 0.41 | 8.25 | Metal powder | 0.000 | 0.000 | 0.00 | 0.15 | 0.00 | 0.99 | 0.31 | 0.00 | 4.62 |
| 64 | 0.00 | 0.00 | 0.00 | 0.00 | 0.00 | 0.00 | 0.00 | 0.00 | 0.00 | 4.65 | 0.21 | 0.20 | 0.41 | 8.25 | Metal powder | 0.000 | 0.000 | 0.00 | 0.15 | 0.00 | 0.99 | 0.31 | 0.00 | 6.40 |
| 65 | 0.00 | 0.00 | 0.00 | 0.00 | 0.00 | 0.00 | 0.00 | 0.00 | 0.00 | 8.69 | 0.21 | 0.20 | 0.41 | 8.25 | Metal powder | 0.000 | 0.000 | 0.00 | 0.15 | 0.00 | 0.99 | 0.31 | 0.00 | 6.59 |
| 66 | 0.00 | 0.00 | 0.00 | 0.00 | 0.00 | 0.00 | 0.00 | 0.00 | 0.00 | 2.59 | 0.00 | 0.00 | 0.00 | 8.25 | Metal powder | 0.000 | 0.000 | 0.00 | 0.00 | 0.00 | | 0.00 | 0.00 | 5.10 |
| 67 | 0.00 | 0.00 | 0.00 | 0.00 | 0.00 | 0.00 | 0.00 | 0.00 | 0.00 | 6.04 | 0.21 | 0.20 | 0.41 | 8.25 | Metal powder | 0.000 | 0.000 | 0.00 | 0.15 | 0.00 | 0.99 | 0.31 | 0.00 | 9.70 |
| 68 | 0.00 | 0.00 | 0.00 | 0.00 | 0.00 | 0.00 | 0.00 | 0.00 | 0.00 | 0.92 | 0.21 | 0.20 | 0.41 | 6.58 | Metal powder | 0.000 | 0.000 | 0.00 | 0.15 | 0.00 | 0.99 | 0.31 | 0.00 | 4.62 |
| 69 | 0.00 | 0.00 | 0.00 | 0.00 | 0.00 | 0.00 | 0.00 | 0.00 | 0.00 | 1.22 | 0.00 | 0.00 | 0.00 | 0.00 | Metal powder | 0.000 | 0.000 | 0.00 | 0.00 | 0.00 | | 0.30 | 0.00 | 2.61 |
| 70 | 0.00 | 0.00 | 0.00 | 0.00 | 0.00 | 0.00 | 0.00 | 0.00 | 0.00 | 0.91 | 0.00 | 0.00 | 0.00 | 0.00 | Metal powder | 0.000 | 0.000 | 0.00 | 0.00 | 0.00 | | 0.18 | 0.00 | 2.59 |
| 71 | 0.00 | 0.00 | 0.00 | 0.00 | 0.00 | 0.00 | 0.00 | 0.00 | 0.00 | 4.84 | 0.00 | 0.00 | 0.00 | 6.58 | Metal powder | 0.000 | 0.000 | 0.00 | 0.00 | 0.00 | | 0.24 | 0.00 | 6.47 |
| 72 | 0.00 | 0.00 | 0.00 | 0.00 | 0.00 | 0.00 | 0.00 | 0.00 | 0.00 | 1.22 | 0.00 | 0.00 | 0.00 | 0.00 | Metal powder | 0.000 | 0.000 | 0.00 | 0.00 | 0.00 | | 0.30 | 0.00 | 5.10 |
| 73 | 0.00 | 0.00 | 0.00 | 0.00 | 0.00 | 0.00 | 0.00 | 0.00 | 0.00 | 7.14 | 0.12 | 0.15 | 0.27 | 0.00 | Metal powder | 0.000 | 0.000 | 0.00 | 0.00 | 0.00 | | 0.15 | 0.00 | 6.00 |
| 74 | 0.00 | 0.00 | 0.00 | 0.00 | 0.00 | 0.00 | 0.00 | 0.00 | 0.00 | 2.98 | 0.00 | 0.00 | 0.00 | 0.00 | Metal powder | 0.000 | 0.000 | 0.00 | 0.00 | 0.00 | | 0.11 | 0.00 | 5.24 |

×For those do not contain any of Na, K, and Cs, values are not listed.

TABLE 3

| | Component Composition of Steel Material | | | | | | | |
|---|---|---|---|---|---|---|---|---|
| | C | Si | Mn | P | S | Cu | Ni | Cr | Mo |
| Content (mass %) | 0.16 | 0.42 | 1.38 | 0.01 | <0.001 | 0.007 | 0.005 | 0.021 | <0.005 |

TABLE 4

| | Component Composition of Steel Material | | | | |
|---|---|---|---|---|---|
| | Ti | V | Al | B | Nb |
| Content (mass %) | <0.002 | 0.006 | 0.036 | 0.0005 | <0.005 |

| | Component Composition of Steel Material | | | |
|---|---|---|---|---|
| | Sn | Zr | O | N |
| Content (mass %) | <0.002 | <0.005 | 0.0006 | 0.0039 |

TABLE 5

| | |
|---|---|
| Steel Material | JIS G 3106 SM490A (Detailed chemical components are shown in Tables 3 and 4) Thickness: 12 mm Length: 430 mm |
| Groove Shape | T-fillet |
| Wire | Flux-cored wires containing components shown in Tables 1 and 2 |
| Welding Posture | Horizontal Vertical Upward |
| Welding Conditions | Wire Extension: 20 mm to 25 mm Current: 250 A to 280 A Voltage: 20 V to 24 V |

TABLE 6

| | |
|---|---|
| Steel Material | JIS G 3106 SM490A (Detailed chemical components are shown in Tables 3 and 4) Width: 25 mm Length: 550 mm Thickness: 50 mm |
| Groove Shape | Flat Plate |
| Wire | Flux-cored wires containing components shown in Tables 1 and 2 |
| Welding Posture | Downward |
| Welding Conditions | Wire Extension: 25 mm Current: 270 A Voltage: 20 V to 24 V |
| Welding Speed | 40 cm/min |

TABLE 7

| | |
|---|---|
| Steel Material | JIS G 3106 SM490A (Detailed chemical components are shown in Tables 3 and 4) Thickness: 20 mm Length: 300 mm |
| Groove Shape | 45° V Groove, Root Gap = 12 mm |
| Wire | Flux-cored wires containing components shown in Tables 1 and 2 |
| Welding Posture | Downward |
| Welding Conditions | Wire Extension: 20 mm to 25 mm Current: 250 A to 280 A Voltage: 20 V to 24 V |
| Lamination Number | 6 layers and 12 paths |
| Pre-heat and Temperature between Paths | No preheat, and Temperature between Paths: 140° C. to 160° C. |
| Welding Heat Input | 1.6 kJ/mm to 2.2 kJ/mm |

«Evaluation»

<Welding Workability>

The welding workability was quantitatively evaluated by fume emission relative to a wire melting amount, a total spatter generation relative to the wire melting amount, and a large grain spatter generation relative to the wire melting amount.

<Welding Workability: Fume Emission>

The fume emission was evaluated by performing welding under the conditions shown in Table 5.

The fume emission relative to the wire melting amount was calculated by dividing the fume emission per unit time by the wire melting amount per unit time. The fume emission per unit time was measured at a current of 270 A in accordance with JIS Z 3930:2013. The welding was performed under the same welding conditions as the measurement conditions for fume emission, and the wire melting amount per unit time was calculated by dividing the wire weight decrease amount by welding time.

In a case where the fume emission relative to the wire melting amount exceeded 8%, the fume emission was large and it was determined as failed (×), in a case where the fume emission relative to the wire melting amount was 8% or less and more than 5%, it was determined as passed (Δ), and in a case where the fume emission relative to the wire melting amount was 5% or less, it was determined as a more preferable result (○).

<Welding Workability: Spatter Generation>

The spatter generation was evaluated by performing welding under the conditions shown in Table 6.

The total spatter generation relative to the wire melting amount was calculated by dividing the spatter generation per unit time by the wire melting amount per unit time. The large grain spatter generation relative to the wire melting amount was calculated by dividing the generation per unit time by the wire melting amount per unit time for a spatter of 1 mm or more. Specifically, the welding was performed in two copper-made collection boxes 1 shown in FIG. 1A and FIG. 1B, and spatters were collected. The total weight of the collected spatters was measured, the spatters were sieved in accordance with JIS Z 8815:1994, and the weight of only a large grain spatter of 1 mm or more was measured.

Figure 1B:
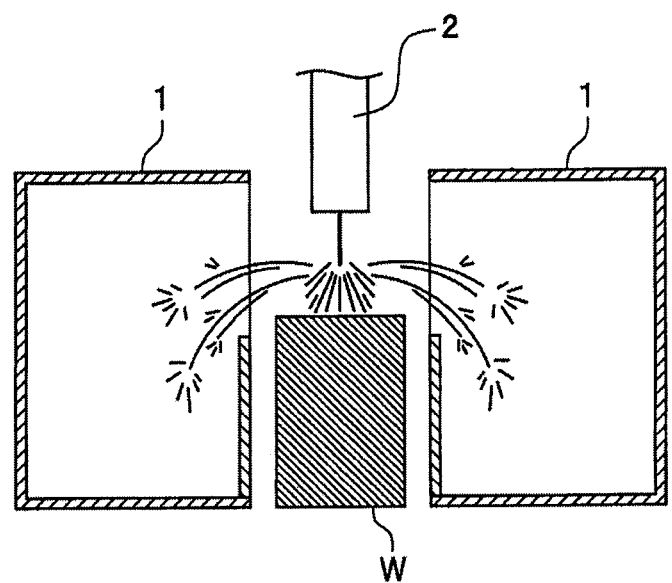
FIG. 1B is an explanatory view of a spatter collection method for measuring a spatter generation in the present invention, and is a cross-sectional view taken along line A-A in FIG. 1A.

Then, as shown in FIG. 1A and FIG. 1B, the spatter generation was measured by placing a material W to be welded between the two collection boxes 1, disposing a torch 2 above the material W to be welded, and performing welding under the conditions shown in Table 6.

In a case where the total spatter generation relative to the wire melting amount was 9% or less and the large grain spatter generation relative to the wire melting amount was 3% or less, it was determined as passed (○), in a case where the total spatter generation relative to the wire melting amount exceeded 9%, the spatter generation was large and it was determined as failed (×), and in a case where the large grain spatter generation relative to the wire melting amount exceeded 3%, the spatter was large and it was determined as failed (×).

<Pore Resistance>

Regarding the pore resistance, during the welding work of "Welding Workability: Fume Emission" performed under the conditions shown in Table 5, in the case where the welding could be performed without generating pore defects such as pits or gas grooves on the bead surface, it was determined as passed (○), and in the case where the welding could not be performed without generating pore defects, it was determined as failed (×).

In a case where the pore resistance was failed, the tests for the mechanical properties (tensile strength and toughness), the cracking resistance, and the diffusible hydrogen content were not performed.

<Mechanical Properties of Weld Metal: Tensile Strength and Toughness>

Regarding the mechanical properties of the weld metal (tensile strength and toughness), the weld metal was prepared under the conditions shown in Table 7, and the test pieces were collected therefrom and evaluated by the test.

Tensile test pieces (No. JISA 1) were taken from the center of the weld metal and the center of the thickness, the tensile test was performed at room temperature in accordance with JIS Z 3111:2005 for the evaluation.

The case where the tensile strength of the weld metal was less than 430 MPa was determined as failed (×), and the case where the tensile strength of the weld metal was 430 MPa or more was determined as passed (○). Among those passed, it was determined as particularly good (◎) in the case where the tensile strength of the weld metal was 430 MPa or more and 670 MPa or less.

Impact test pieces (JISV notched test pieces) were taken from the center of the weld metal and the center of the thickness, the impact test was performed at 0° C. and −30° C. in accordance with JIS Z 3111:2005 for the evaluation.

The case where the impact absorbed energy at 0° C. was less than 47 J was determined as failed (×), and the case where the impact absorbed energy at 0° C. was 47 J or more was determined as passed (○). Among those passed, it was determined as particularly good (◎) in the case where the impact absorbed energy at 0° C. was 100 J or more and the impact absorbed energy at −30° C. was 47 J or more.

<Cracking Resistance>

A C-type restraint cracking test was performed in accordance with JIS Z 3155:1993 and the cracking resistance was evaluated based on the results of the test. Specifically, the welding current was 280 A, the welding speed was 40 cm/min, and an X-ray transmission test was performed. It was determined as failed (×) in the case where the cracking occurred, and it was determined as passed (○) in the case where the cracking did not occur.

<Diffusible Hydrogen Content>

The diffusible hydrogen content was measured by gas chromatography in accordance with JIS Z 3118:2007. It was determined as passed (○) in the case where the diffusible hydrogen content was 15 mL/100 g or less, and it was determined as failed (×) in the case where the diffusible hydrogen content was more than 15 mL/100 g.

The results of the above various tests are shown in Table 8 below.

TABLE 8

| Wire No. | Welding Workability | | | Mechanical Property | | Cracking Resistance | Diffusible Hydrogen Content |
| --- | --- | --- | --- | --- | --- | --- | --- |
| | Fume Emission | Spatter Generation | Pore Resistance | Tensile Strength | Toughness | | |
| 1 | ○ | ○ | ○ | ◎ | ◎ | ○ | ○ |
| 2 | ○ | ○ | ○ | ◎ | ◎ | ○ | ○ |
| 3 | ○ | ○ | ○ | ◎ | ◎ | ○ | ○ |
| 4 | ○ | ○ | ○ | ◎ | ◎ | ○ | ○ |
| 5 | Δ | ○ | ○ | ◎ | ◎ | ○ | ○ |
| 6 | ○ | ○ | ○ | ◎ | ◎ | ○ | ○ |
| 7 | ○ | ○ | ○ | ◎ | ○ | ○ | ○ |
| 8 | ○ | ○ | ○ | ○ | ○ | ○ | ○ |
| 9 | ○ | ○ | ○ | ◎ | ◎ | ○ | ○ |
| 10 | Δ | ○ | ○ | ◎ | ◎ | ○ | ○ |
| 11 | ○ | ○ | ○ | ◎ | ◎ | ○ | ○ |
| 12 | ○ | ○ | ○ | ◎ | ◎ | ○ | ○ |
| 13 | ○ | ○ | ○ | ◎ | ◎ | ○ | ○ |
| 14 | ○ | ○ | ○ | ◎ | ◎ | ○ | ○ |
| 15 | ○ | ○ | ○ | ◎ | ◎ | ○ | ○ |
| 16 | ○ | ○ | ○ | ◎ | ◎ | ○ | ○ |
| 17 | ○ | ○ | ○ | ◎ | ◎ | ○ | ○ |
| 18 | ○ | ○ | ○ | ◎ | ◎ | ○ | ○ |
| 19 | ○ | ○ | ○ | ◎ | ◎ | ○ | ○ |
| 20 | ○ | ○ | ○ | ◎ | ◎ | ○ | ○ |
| 21 | ○ | ○ | ○ | ◎ | ◎ | ○ | ○ |
| 22 | ○ | ○ | ○ | ◎ | ◎ | ○ | ○ |
| 23 | Δ | ○ | ○ | ◎ | ◎ | ○ | ○ |
| 24 | ○ | ○ | ○ | ◎ | ◎ | ○ | ○ |
| 25 | ○ | ○ | ○ | ○ | ◎ | ○ | ○ |
| 26 | ○ | ○ | ○ | ◎ | ◎ | ○ | ○ |
| 27 | ○ | ○ | ○ | ◎ | ◎ | ○ | ○ |
| 28 | ○ | ○ | ○ | ○ | ◎ | ○ | ○ |
| 29 | ○ | ○ | ○ | ◎ | ◎ | ○ | ○ |
| 30 | ○ | ○ | ○ | ◎ | ◎ | ○ | ○ |
| 31 | ○ | ○ | ○ | ◎ | ◎ | ○ | ○ |
| 32 | ○ | ○ | ○ | ◎ | ◎ | ○ | ○ |
| 33 | ○ | ○ | ○ | ◎ | ◎ | ○ | ○ |

TABLE 8-continued

| | Welding Workability | | | Mechanical Property | | | Diffusible |
|---|---|---|---|---|---|---|---|
| Wire No. | Fume Emission | Spatter Generation | Pore Resistance | Tensile Strength | Toughness | Cracking Resistance | Hydrogen Content |
| 34 | ○ | ○ | ○ | ◎ | ◎ | ○ | ○ |
| 35 | ○ | ○ | ○ | ○ | ◎ | ○ | ○ |
| 36 | ○ | ○ | ○ | ◎ | ◎ | ○ | ○ |
| 37 | ○ | ○ | ○ | ◎ | ○ | ○ | ○ |
| 38 | ○ | ○ | ○ | ◎ | ○ | ○ | ○ |
| 39 | ○ | ○ | ○ | ○ | ◎ | ○ | ○ |
| 40 | ○ | ○ | ○ | ◎ | ○ | ○ | ○ |
| 41 | ○ | ○ | ○ | ◎ | ◎ | ○ | ○ |
| 42 | ○ | ○ | ○ | ◎ | ◎ | ○ | ○ |
| 43 | ○ | ○ | ○ | ◎ | ◎ | ○ | ○ |
| 44 | ○ | ○ | ○ | ◎ | ◎ | ○ | ○ |
| 45 | ○ | ○ | ○ | ◎ | ◎ | ○ | ○ |
| 46 | ○ | ○ | ○ | ◎ | ◎ | ○ | ○ |
| 47 | ○ | ○ | ○ | ◎ | ◎ | ○ | ○ |
| 48 | ○ | ○ | ○ | ◎ | ◎ | ○ | ○ |
| 49 | ○ | X Large | ○ | ○ | X | ○ | ○ |
| 50 | ○ | ○ | ○ | ○ | X | ○ | ○ |
| 51 | ○ | ○ | ○ | ○ | X | ○ | ○ |
| 52 | ○ | ○ | ○ | ○ | X | ○ | ○ |
| 53 | X | X Much | ○ | ○ | ◎ | ○ | ○ |
| 54 | X | ○ | ○ | ○ | ◎ | ○ | ○ |
| 55 | ○ | ○ | ○ | ○ | X | ○ | ○ |
| 56 | ○ | ○ | ○ | ○ | X | ○ | ○ |
| 57 | ○ | ○ | ○ | ○ | X | ○ | ○ |
| 58 | ○ | ○ | ○ | ○ | ○ | X | ○ |
| 59 | ○ | ○ | ○ | ○ | ○ | X | X |
| 60 | ○ | ○ | ○ | ○ | X | ○ | ○ |
| 61 | ○ | ○ | X | Not tested | Not tested | Not tested | Not tested |
| 62 | ○ | X Much | ○ | ○ | X | X | ○ |
| 63 | ○ | ○ | ○ | ○ | ○ | X | ○ |
| 64 | ○ | X Much | ○ | ○ | ○ | ○ | ○ |
| 65 | ○ | X Much | ○ | ○ | ○ | ○ | ○ |
| 66 | ○ | X Much | ○ | ○ | ◎ | ○ | ○ |
| 67 | Δ | X Much | ○ | ○ | ◎ | ○ | ○ |
| 68 | ○ | ○ | ○ | ○ | ○ | X | ○ |
| 69 | ○ | ○ | X | Not tested | Not tested | Not tested | Not tested |
| 70 | ○ | ○ | ○ | ○ | X | ○ | ○ |
| 71 | ○ | ○ | ○ | ○ | ○ | X | ○ |
| 72 | ○ | ○ | ○ | ○ | ○ | X | ○ |
| 73 | ○ | ○ | ○ | X | ○ | ○ | ○ |
| 74 | ○ | ○ | ○ | ○ | X | ○ | ○ |

«Examination of Results»

As shown in Table 8, it is found that in wire No. 1 to No. 48 satisfying the requirements of the present invention, the welding workability is excellent, the diffusible hydrogen content in a weld metal is small, the pore resistance and cracking resistance are excellent, and the tensile strength and toughness of the weld metal are also excellent.

Meanwhile, as shown in Table 8, since wire No. 49 to No. 74 do not satisfy the requirements of the present invention, no passed result is obtained in any of the evaluation items. Specifically, the results are as follows.

In the wire No. 49, the Li and S contents were small and the value calculated by Formula (2) was small, and as a result, the size of the spatter was large, the spatter generation was large, and the toughness was failed.

In the wire No. 50, the Li and Mg contents were small and the value calculated by Formula (2) was small, and as a result, the toughness was failed.

In the wire No. 51, the Li and Mg contents were small and the value calculated by Formula (2) was small, and as a result, the toughness was failed.

In the wire No. 52, the Li and Mg contents were small and the value calculated by Formula (2) was small, and as a result, the toughness was failed.

In the wire No. 53, the Fe and Li contents were large, and as a result, the spatter generation and the fume emission were large.

In the wire No. 54, the Fe content was large, and as a result, the fume emission was large.

In the wire No. 55, the Li content was small and the value calculated by Formula (2) was small, and as a result, the toughness was failed.

In the wire No. 56, the Li content was small and the value calculated by Formula (2) was small, and as a result, the toughness was failed.

In the wire No. 57, the Li and Mg contents were small and the value calculated by Formula (2) was small, and as a result, the toughness was failed.

In the wire No. 58, the Ni content was large, and as a result, the cracking resistance was failed.

In the wire No. 59, the Fe content was small and the Mg content was large, and as a result, the cracking resistance and the diffusible hydrogen content were failed.

In the wire No. 60, the acid-soluble Al content was large and the value calculated by Formula (2) was small, and as a result, the toughness was failed.

In the wire No. 61, the acid-soluble Al content was small, and as a result, the pore resistance was failed.

In the wire No. 62, the Mg, C and Cu contents were large, and as a result, the spatter generation was large and the toughness and the cracking resistance were failed.

In the wire No. 63, the S content was small and the value calculated by Formula (4) was small, and as a result, the cracking resistance was failed.

In the wire No. 64, the $CO_2$ and REM contents were large, and as a result, the spatter generation was large.

In the wire No. 65, the Ba content was large, and as a result, the spatter generation was large.

In the wire No. 66, the Sr content was large, and as a result, the spatter generation was large.

In the wire No. 67, the F and Ca contents were large, and as a result, the spatter generation was large.

In the wire No. 68, the P content was large, and as a result, the cracking resistance was failed.

In the wire No. 69, the value calculated by Formula (3) was small, and as a result, the pore resistance was failed.

In the wire No. 70, the value calculated by Formula (2) was small, and as a result, the toughness was failed.

In the wire No. 71, the value calculated by Formula (1) was large, and as a result, the cracking resistance was failed.

In the wire No. 72, the value calculated by Formula (4) was small, and as a result, the cracking resistance was failed.

In the wire No. 73, the value calculated by Formula (1) was small, and as a result, the tensile strength was failed.

In the wire No. 74, the Li content was small, and as a result, the toughness was failed.

From the above, it is found that according to the flux-cored wire of the present invention, the welding workability is excellent, the diffusible hydrogen content in the weld metal is small, the pore resistance and cracking resistance are excellent, and the tensile strength and toughness of the weld metal are also excellent.

While the present invention has been described in detail and with reference to specific embodiments, it will be apparent to those skilled in the art that various changes and modifications can be made without departing from the spirit and scope of the invention.

This application is based on the Japanese patent application No. 2016-090988 filed on Apr. 28, 2016, the contents of which are incorporated herein by reference.

INDUSTRIAL APPLICABILITY

The flux-cored wire of the present invention is excellent in welding workability and small in diffusible hydrogen content in the weld metal, and also excellent in pore resistance and cracking resistance, and tensile strength and toughness of the weld metal, and thus is particularly useful for a self-shielded arc welding method.

The invention claimed is:

1. A flux-cored wire for self-shielded arc welding, which has a steel outer sheath filled with a flux, the flux-cored wire comprising, relative to a total mass of the wire:
   F: 0.10 mass % or more and 4.00 mass % or less;
   Li: 0.25 mass % or more and 2.30 mass % or less;
   acid-soluble Al: 1.00 mass % or more and 5.25 mass % or less;
   Mg: 0.80 mass % or more and 3.10 mass % or less;
   S: 0.0005 mass % or more and 0.2000 mass % or less;
   $CO_2$: 0.17 mass % or more and 2.00 mass % or less;
   Ba: 0 mass % or more and 8.00 mass % or less;
   Ca: 0 mass % or more and 5.00 mass % or less;
   Sr: 0 mass % or more and 2.00 mass % or less;
   REM: 0 mass % or more and 1.50 mass % or less;
   P: 0.070 mass % or less;
   iron oxide in an amount of 7.13 mass % or more and 10 mass % or less, in terms of FeO; and
   one or more of C not derived from a carbonate: 0.65 mass % or less, Mn: 11.00 mass % or less, Ni: 11.00 mass % or less, and Cu: 1.50 mass % or less,
   one or more of Ti and Zr in a total amount of 0.01 mass % or more and 3.00 mass % or less,
   wherein the following Formulas (1) to (4) are satisfied:

$$0.60 \leq 10 \times [\text{C not derived from carbonate}]+[\text{Mn}]+[\text{Ni}]+[\text{Cu}] \leq 15.00 \quad (1)$$

$$7.5 \times [\text{Li}]-[\text{acid-soluble Al}]+10 \times [\text{C not derived from carbonate}]+[\text{Mn}]+[\text{Ni}]+[\text{Cu}] \geq 1.50 \quad (2)$$

$$0.33 \times [\text{F}]+[\text{acid-soluble Al}]+[\text{Li}]+[\text{Mg}]+[CO_2] \geq 3.00 \quad (3)$$

$$[\text{Mn}]+[\text{Ba}]+[\text{Ca}]+[\text{Sr}]+[\text{REM}]-20 \times [\text{S}] \geq -0.60 \quad (4)$$

wherein the term [component] in the above formulas is a content in mass % of the component relative to the total mass of the wire, and wherein a source of the S includes at least one of a sulfide added to the flux and a sulfate added to the flux.

2. The flux-cored wire according to claim 1, further comprising one or more of the following:
   (a) one or more of Cr, Mo, V and W in a total amount of 4.00 mass % or less;
   (b) one or more of Nb, Ta and Co in a total amount of 1.00 mass % or less;
   (e) Bi in an amount of 0.100 mass % or less;
   (f) B in an amount of 0.100 mass % or less;
   (g) one or more of Na, K and Cs with a total amount of 2.50 mass % or less of Li and the one or more of Na, K, and Cs;
   (h) Si in an amount of 0.01 mass % or more and 3.00 mass % or less; and
   (i) Zn in an amount of 1.00 mass % or less.

3. The flux-cored wire according to claim 1, further comprising one or more of Ba, Ca, Sr, and REM in a total content of 0.15 mass % or more.

4. The flux-cored wire according to claim 1, which comprises
   Ba in a content of 0.50 mass % or more and F in a content of 0.50 mass % or more,
   wherein a total content of Ba, Ca, Sr, and REM is 1.40 mass % or more.

5. The flux-cored wire according to claim 1,
   wherein a content of Mg contained as a metal powder or alloy powder in the Mg content, relative to the total mass of the wire, is 0.80 mass % or more.

6. The flux-cored wire according to claim 1,
   wherein the following Formula (5) is satisfied:

$$[\text{F}]+0.5 \times [\text{acid-soluble Al}]+[\text{Li}]+[\text{Mg}]+[CO_2] \leq 7.00 \quad (5)$$

wherein the term [component] in the above formula is a content in mass % of the component relative to the total mass of the wire.

7. The flux-cored wire according to claim 2,
   wherein the following Formula (5) is satisfied:

$$[\text{F}]+0.5 \times [\text{acid-soluble Al}]+[\text{Li}]+[\text{Mg}]+[CO_2] \leq 7.00 \quad (5)$$

wherein the term [component] in the above formula is a content in mass % of the component relative to the total mass of the wire.

8. The flux-cored wire according to claim 3,
   wherein the following Formula (5) is satisfied:

$$[\text{F}]+0.5 \times [\text{acid-soluble Al}]+[\text{Li}]+[\text{Mg}]+[CO_2] \leq 7.00 \quad (5)$$

wherein the term [component] in the above formula is a content in mass % of the component relative to the total mass of the wire.

9. The flux-cored wire according to claim 4, wherein the following Formula (5) is satisfied:

$$[F]+0.5\times[\text{acid-soluble Al}]+[Li]+[Mg]+[CO_2] \leq 7.00 \quad (5)$$

wherein the term [component] in the above formula is a content in mass % of the component relative to the total mass of the wire.

10. The flux-cored wire according to claim 5, wherein the following Formula (5) is satisfied:

$$[F]+0.5\times[\text{acid-soluble Al}]+[Li]+[Mg]+[CO_2] \leq 7.00 \quad (5)$$

wherein the term [component] in the above formula is a content in mass % of the component relative to the total mass of the wire.

* * * * *